US011945245B2

(12) United States Patent
Elzey et al.

(10) Patent No.: US 11,945,245 B2
(45) Date of Patent: Apr. 2, 2024

(54) HEAT PRESS, COMPONENTS, APPARATUSES, SYSTEMS, AND METHODS

(71) Applicant: Cricut, Inc., South Jordan, UT (US)

(72) Inventors: James Alan Elzey, Heber, UT (US); Xiao Peng, Xiamen (CN); Yung Tseng Chen, San Francisco, CA (US); Ildefonso M. Resuello, Jr., Sacramento, CA (US); Grayson Stopp, San Francisco, CA (US); Marc Korbuly, Salt Lake City, UT (US); Thomas Crisp, Cottonwood Heights, UT (US); Scot Herbst, Santa Cruz, CA (US)

(73) Assignee: Cricut, Inc., South Jordan, UT (US)

( * ) Notice: Subject to any disclaimer, the term of this patent is extended or adjusted under 35 U.S.C. 154(b) by 85 days.

(21) Appl. No.: 17/931,890

(22) Filed: Sep. 13, 2022

(65) Prior Publication Data

US 2023/0112267 A1 Apr. 13, 2023

Related U.S. Application Data

(63) Continuation of application No. 17/651,764, filed on Feb. 18, 2022, now abandoned, which is a (Continued)

(51) Int. Cl.

*B41F 16/02* (2006.01)
*B41F 16/00* (2006.01)

(Continued)

(52) U.S. Cl.

CPC ................ *B41K 1/00* (2013.01); *B41F 16/00* (2013.01); *B41F 16/02* (2013.01); *B41F 17/00* (2013.01)

(58) Field of Classification Search

CPC ......... D06F 79/00–06; D06F 75/00–40; B41F 16/00; B41F 16/02; B41K 17/00; B41K 1/00

See application file for complete search history.

(56) References Cited

U.S. PATENT DOCUMENTS 644,472 A 2/1900 Segschneider
D32,831 S 6/1900 Willaims (Continued)

FOREIGN PATENT DOCUMENTS

CA 2751232 A1 9/2010
CN 1420226 A 5/2003

(Continued)

OTHER PUBLICATIONS

International Search Report for International Application No. PCT/US2020/046436, dated Nov. 20, 2020, 3 pages.

(Continued)

*Primary Examiner* — Nguyen Q. Ha

(57) ABSTRACT

A heat press docking station base (52) comprises a nest portion (75) and one or more legs (58). The nest portion (52) includes a body shell (60, 62) and a perforated floor (54). The body shell (60, 62) includes a lower surface (63). The perforated floor (54) is connected to the body shell (60, 62). The one or more legs (58) extend from a lower surface (63) of the body shell (60, 62).

20 Claims, 22 Drawing Sheets

Related U.S. Application Data continuation of application No. PCT/US2020/046436, filed on Aug. 14, 2020.

(60) Provisional application No. 63/022,304, filed on May 8, 2020, provisional application No. 62/897,096, filed on Sep. 6, 2019, provisional application No. 62/888,518, filed on Aug. 18, 2019.

(51) Int. Cl.

| | |
|---|---|
| ***B41F 17/00*** | (2006.01) |
| ***B41K 1/00*** | (2006.01) |
| ***D06F 75/34*** | (2006.01) |
| ***D06F 75/36*** | (2006.01) |
| ***D06F 79/00*** | (2006.01) |
| ***D06F 79/02*** | (2006.01) |

(56) References Cited

U.S. PATENT DOCUMENTS

| | | | | |
|---|---|---|---|---|
| 827,864 | A | 8/1906 | Hamill | |
| 1,102,399 | A | 7/1914 | Eilau | |
| 2,170,591 | A | 8/1939 | Holt | |
| 2,632,969 | A | 3/1953 | Gerber | |
| 2,655,333 | A | 10/1953 | Taylor | |
| 2,829,452 | A | 4/1958 | Humphrey | |
| 3,015,176 | A | 1/1962 | Freeman | |
| 3,202,389 | A | 8/1965 | Zoffer | |
| 3,703,042 | A | 11/1972 | Smith | |
| 3,916,546 | A | 11/1975 | Bullock | |
| 3,964,185 | A | 6/1976 | Bullock | |
| 4,117,612 | A | 10/1978 | Baumgartner | |
| 4,347,428 | A | 8/1982 | Conrad | |
| 4,379,018 | A | 4/1983 | Griesdorn | |
| 4,455,473 | A | 6/1984 | Schwob | |
| 4,620,839 | A | 11/1986 | Moritoki et al. | |
| 4,661,685 | A * | 4/1987 | Contri | D06F 75/26 219/250 |
| 4,686,352 | A | 8/1987 | Nawrot | |
| 4,727,240 | A * | 2/1988 | Provolo | D06F 75/26 219/250 |
| D300,479 | S | 3/1989 | Paulin | |
| 4,918,845 | A | 4/1990 | Livecchi | |
| 5,010,664 | A | 4/1991 | Sakano | |
| 5,042,179 | A | 8/1991 | Van Der Meer | |
| 5,252,171 | A | 10/1993 | Anderson et al. | |
| 5,512,728 | A | 4/1996 | Jalbert | |
| D393,118 | S | 3/1998 | Garrett | |
| 5,769,999 | A | 6/1998 | Anderson | |
| 5,854,466 | A | 12/1998 | Chou | |
| 5,908,000 | A | 6/1999 | Spychalla | |
| 5,983,903 | A | 11/1999 | Nanba | |
| 6,035,777 | A | 3/2000 | King | |
| 6,052,928 | A | 4/2000 | Lin | |
| 6,054,690 | A | 4/2000 | Petit | |
| 6,172,335 | B1 | 1/2001 | Goodrich | |
| 6,209,605 | B1 | 4/2001 | Lee | |
| 6,452,501 | B1 * | 9/2002 | Tse | D06F 75/26 219/509 |
| 6,494,216 | B1 | 12/2002 | Hirata | |
| 6,648,189 | B1 | 11/2003 | Minton et al. | |
| 6,722,063 | B1 | 4/2004 | Uchikoshi | |
| D546,517 | S | 7/2007 | Choi | |
| D610,763 | S | 2/2010 | Massip | |
| 7,926,208 | B2 | 4/2011 | Cavada | |
| 7,980,433 | B2 | 7/2011 | Wynn | |
| 8,089,030 | B2 | 1/2012 | Harrington | |
| D670,044 | S | 10/2012 | Andreesen | |
| 8,539,700 | B2 | 9/2013 | Saba | |
| 9,085,848 | B2 | 7/2015 | Crain | |
| 9,334,604 | B1 | 5/2016 | Li | |
| 9,553,442 | B2 | 1/2017 | Chou | |
| 9,687,038 | B2 | 6/2017 | Chae | |
| 10,876,250 | B2 | 12/2020 | Stopp | |
| 11,155,957 | B2 | 10/2021 | Alipour | |
| 11,208,758 | B2 | 12/2021 | Stopp | |
| 2002/0020085 | A1 | 2/2002 | Kobayashi | |
| 2003/0094445 | A1 | 5/2003 | Alday Lesaga | |
| 2004/0016348 | A1 | 1/2004 | Sharpe | |
| 2004/0133295 | A1 * | 7/2004 | Cohen | D06F 75/26 700/130 |
| 2006/0076341 | A1 * | 4/2006 | Lozinski | D06F 75/26 219/248 |
| 2006/0081588 | A1 * | 4/2006 | Bowser | D06F 75/265 219/248 |
| 2006/0086712 | A1 * | 4/2006 | Feldmeier | D06F 75/26 219/250 |
| 2006/0141884 | A1 | 6/2006 | Haque | |
| 2009/0165341 | A1 | 7/2009 | Janakiraman | |
| 2010/0236110 | A1 * | 9/2010 | Lee | D06F 75/26 219/509 |
| 2011/0076079 | A1 | 3/2011 | Robinson | |
| 2015/0245723 | A1 | 9/2015 | Alexander | |
| 2021/0337916 | A1 | 11/2021 | Robinson | |

FOREIGN PATENT DOCUMENTS

| | | | |
|---|---|---|---|
| CN | 2732486 | Y | 10/2005 |
| CN | 101160425 | A | 4/2008 |
| CN | 101443510 | A | 5/2009 |
| CN | 201626166 | U | 11/2010 |
| CN | 202323519 | U | 7/2012 |
| CN | 103321029 | A | 9/2013 |
| CN | 203739398 | U | 7/2014 |
| CN | 205496726 | U | 8/2016 |
| CN | 106515204 | A | 3/2017 |
| CN | 107489011 | A | 12/2017 |
| CN | 109642392 | A | 4/2019 |
| CN | 110525023 | A | 12/2019 |
| DE | 2921062 | A | 3/1979 |
| DE | 4424333 | A1 | 1/1996 |
| EP | 2606761 | A1 | 6/2013 |
| JP | 07-299299 | A | 11/1995 |
| JP | H10277295 | A | 10/1998 |
| JP | 2002166100 | A | 6/2002 |
| JP | 2004-073607 | A | 3/2004 |
| JP | 2005029217 | A | 2/2005 |
| JP | 2011078615 | A | 4/2011 |
| KR | 20-1996-0001851 | A | 1/1996 |
| KR | 20-0268681 | Y1 | 3/2002 |
| KR | 10-2005-0096555 | A | 10/2005 |
| KR | 10-0675979 | B1 | 1/2007 |
| WO | 2012153242 | A2 | 11/2012 |
| WO | 2019109411 | A1 | 6/2019 |
| WO | 2021034687 | A1 | 2/2021 |

OTHER PUBLICATIONS

International Written Opinion for International Application No. PCT/US2020/046436, dated Nov. 20, 2020, 11 pages.
International Search Report and Written Opinion for International Application No. PCT/US2018/044799, dated Nov. 18, 2018, 10 pages.
European Supplemental Search Report for European U.S. Appl. No. 18/821,978, dated Feb. 18, 2018, 7 pages.
Canadian Office Action for Canadian Application No. 3,028,673, dated Jul. 22, 2020, 4 pages.
Canadian Office Action for Canadian Application No. 3,028,673, dated Nov. 25, 2019, 4 pages.
U.S. Office Action U.S. Appl. No. 16/777,449, dated Mar. 11, 2020, 11 pages.
Australian Patent Examination Report No. 1 for Australian Application No. 2022200753, dated Jan. 9, 2023, 3 pages.
International Search Report and Written Opinion for International Application N. PCT/US2023/063703, dated Jun. 19, 2023, 12 pages.

* cited by examiner

HEAT PRESS, COMPONENTS, APPARATUSES, SYSTEMS, AND METHODS

CROSS-REFERENCE TO RELATED APPLICATIONS

This U.S. patent application is a continuation of, and claims priority to, U.S. patent application Ser. No. 17/651,764 filed on Feb. 18, 2022, which is a continuation of, and claims priority under 35 U.S.C. § 120 from, International Application No. PCT/US2020/046436, filed on Aug. 14, 2020, which claims priority to U.S. Patent Application No. 62/888,518, filed on Aug. 18, 2019, titled "Heat Press," U.S. Patent Application No. 62/897,096, filed on Sep. 6, 2019, titled "Heat Press," and U.S. Patent Application No. 63/022,304, filed on May 8, 2020, titled "Heat Press Safety Features," the disclosures of which are considered part of the disclosure of this application and are hereby incorporated by reference in their entireties.

TECHNICAL FIELD

This disclosure relates generally to heat presses, components, apparatuses, systems, and methods.

BACKGROUND

This section provides background information related to the present disclosure and is not necessarily prior art.

While known heat presses, components, apparatuses, systems and methods have proven to be acceptable for various applications, such heat presses, components, apparatuses, systems and methods are nevertheless susceptible to improvements that may enhance their overall performance and cost. Therefore, a need exists to develop improved heat press components, apparatuses, systems and methods that advance the art.

SUMMARY

This section provides a general summary of the disclosure, and is not a comprehensive disclosure of its full scope or all of its features.

One aspect of the disclosure provides a heat press docking station base comprising a nest portion and one or more legs. The nest portion includes a body shell and a perforated floor. The body shell includes a lower surface. The perforated floor may be connected to the body shell. The one or more legs extend from a lower surface of the body shell.

Implementations of the disclosure may include one or more of the following optional features. In some implementations, the body shell includes an inner peripheral body shell portion and an outer peripheral body shell portion joined to the inner peripheral body shell portion. The one or more legs may be integrally extend from a lower surface of the outer peripheral body shell portion that may be joined to the inner peripheral body shell portion.

In some examples, the inner peripheral body shell portion and the outer peripheral body shell portion are joined to the inner peripheral body shell portion in order to cooperate to form one or more peripheral interior spaces or gaps that include an insulative gas. The insulative gas may be subjected to a vacuum.

In other examples, the heat press docking station base may further include one or more heat plate support protrusions extending from the nest portion. The one or more heat plate support protrusions extend from the inner peripheral body shell portion of the nest portion. In yet other examples, the one or more heat plate support protrusions extend from the perforated floor of the nest portion. In further examples, the one or more heat plate support protrusions extend from: the inner peripheral body shell portion of the nest portion; and the perforated floor of the nest portion. In some examples, the one or more heat plate support protrusions are not aligned with and are offset from the one or more legs at a distance. In yet other examples, an upper-most surface of the one or more heat plate support protrusions extend away from an upper surface of the perforated floor at a first distance. The one or more legs extend away from a lower surface of the perforated floor at a second distance. The first distance, the second distance and a thickness of the perforated floor may define a length of each perforated passage extending through the thickness of the perforated floor. In other implementations, the heat press docking station base may further include a heat resistant material insert disposed within a cavity formed by the one or more legs.

Another aspect of the disclosure provides a subassembly of a heat press. The subassembly may include: a force deflector including an upper handle portion; and an insulation base portion coupled to the force deflector.

Implementations of the disclosure may include one or more of the following optional features. In some implementations, the force deflector further includes a lower bowl-shaped portion extending from a distal end of the upper handle portion. The lower bowl-shaped portion includes downwardly-facing lip. The insulation base portion may further include: a lower bowl-shaped portion including: a downwardly-facing lip; and a peripheral upwardly-facing ledge surface that may define a portion of an upper surface of the insulation base portion. The downwardly-facing lip of the lower bowl-shaped portion of the force deflector may be disposed adjacent, and mates with, the peripheral upwardly-facing ledge surface of the insulation base portion. A proximal end of the upper handle portion of the force deflector may be configured to receive a user-applied force that may be deflected: in a first direction from the proximal end of the upper handle portion of the force deflector; then in a second direction from the distal end of the upper handle portion of the force deflector out of the downwardly-facing lip of the lower bowl-shaped portion of the force deflector; then into the peripheral upwardly-facing ledge surface of the upper surface of the insulation base portion in a third direction; and then out of the downwardly-facing lip of the lower bowl-shaped portion of the insulation base portion in a fourth direction.

In other examples, the subassembly may further include an insulation layer disposed within the lower bowl-shaped portion of the force deflector. In yet other examples, the insulation layer may be disposed within the lower bowl-shaped portion of the insulation base portion. In further examples, a first insulation layer may be disposed within the lower bowl-shaped portion of the insulation base portion and a second insulation layer may be disposed within the lower bowl-shaped portion of the force deflector. In some configurations, the force deflector may at least partially define a proximal end of the heat press that may be configured to receive a user-applied force; and the insulation base portion may at least partially define a distal end of the heat press that may be configured to output the user-applied force.

Yet another aspect of the disclosure provides a heat press. The heat press includes a deflector subassembly including a force deflector and an insulation base portion. The force deflector includes an upper handle portion. The insulation base portion may be connected to the force deflector. The heat press also includes a heating subassembly having electronics, a heating coil, and a heat plate. The electronics are connected to a power source. The electronics include at least one of an actuator and a controller. The heating coil may be connected to the electronics. The heat plate may be thermally coupled to the heating coil. The heat press also includes a housing cover that may be connected to and at least partially encloses one or more components of both of the deflector subassembly and the heating subassembly.

Implementations of the disclosure may include one or more of the following optional features. In some implementations, the force deflector further includes a lower bowl-shaped portion extending from a distal end of the upper handle portion. The lower bowl-shaped portion includes a downwardly-facing lip. The insulation base portion further includes a lower bowl-shaped portion having: a downwardly-facing lip; and a peripheral upwardly-facing ledge surface that may define a portion of an upper surface of the insulation base portion. The downwardly-facing lip of the lower bowl-shaped portion of the force deflector may be disposed adjacent and mates with the peripheral upwardly-facing ledge surface of the insulation base portion. A proximal end of the upper handle portion of the force deflector may be configured to receive a user-applied force that may be deflected: in a first direction from the proximal end of the upper handle portion of the force deflector; then in a second direction from the distal end of the upper handle portion of the force deflector out of the downwardly-facing lip of the lower bowl-shaped portion of the force deflector; then into the peripheral upwardly-facing ledge surface of the upper surface of the insulation base portion in a third direction; and then out of the downwardly-facing lip of the lower bowl-shaped portion of the insulation base portion in a fourth direction into a peripheral edge of an upper surface of the heat plate.

In some examples, the heat press further includes an insulation layer disposed within the lower bowl-shaped portion of the force deflector. In other examples, the insulation layer may be disposed within the lower bowl-shaped portion of the insulation base portion. In other examples, a peripheral edge of an upper surface of the heat plate may be disposed adjacent the downwardly-facing lip of the lower bowl-shaped portion of the insulation base portion whereby the heat plate encloses a cavity formed for the lower bowl-shaped portion of the insulation base portion for containing the insulation layer within the lower bowl-shaped portion of the insulation base portion.

In other configurations the heat press further includes a first insulation layer disposed within the lower bowl-shaped portion of the insulation base portion; and a second insulation layer disposed within the lower bowl-shaped portion of the force deflector. A peripheral edge of an upper surface of the heat plate may be disposed adjacent the downwardly-facing lip of the lower bowl-shaped portion of the insulation base portion whereby the heat plate encloses a cavity formed for the lower bowl-shaped portion of the insulation base portion for containing the first insulation layer within the lower bowl-shaped portion of the insulation base portion. In some instances, the force deflector may at least partially define a proximal end of the heat press that may be configured to receive a user-applied force; and the insulation base portion may at least partially define a distal end of the heat press that may be configured to output the user-applied force.

One aspect of the disclosure provides a heating subassembly of a heat press. The heating subassembly includes a heat plate including a body having a side surface and an upper surface. The side surface couples the upper surface of the body to an implement-contact heating surface. The upper surface may define a heating coil enclosure portion. The heating subassembly also includes a heating coil disposed within the heating coil enclosure portion whereby the heating coil may be configured to heat the implement-contact heating surface of the heat plate.

Implementations of the disclosure may include one or more of the following optional features. In some implementations, the side surface includes a first outer peripheral edge and a second outer peripheral edge. The second outer peripheral edge extends from the first outer peripheral edge at an angle that may define a precision tip. The angle may be between about 10° and about 120°.

In some implementations, an outer peripheral surface of the heating coil may be equally spaced away from the first outer peripheral edge and the second outer peripheral edge at a distance. In other implementations, the heating coil may include a first end and a second end. A length of the heating coil may extend between the first end. The second end may be non-linearly arranged in a substantially tear-drop shape. The first end of the heating coil may be arranged near the precision tip. The second end of the heating coil may be arranged near but spaced away from the first end of the heating coil. A first terminal of the heating coil may extend substantially perpendicularly from the first end of the heating coil. A second terminal may extend substantially perpendicularly from the second end of the heating coil. The heating coil enclosure portion may define an inlet opening and an outlet opening. The inlet opening may be sized for permitting passage of the first terminal of the heating coil there-through. The outlet opening may be sized for permitting passage of the second terminal there-through.

Another aspect of the disclosure provides a compact packaging subassembly of a heat press. The compact packaging subassembly includes a housing cover and electronics. The housing cover includes: a proximal end; a distal end; a handle portion; a leading side portion having a proximal end portion extending from a first end of the handle portion; a trailing side portion having a proximal end portion extending from a second end of the handle portion; and a heating subassembly-receiving base portion having a first end and a second end. The first end of the heating subassembly-receiving base portion may be connected to a distal end portion of the leading side portion. The second end of the heating subassembly-receiving base portion may be connected to a distal end portion of the trailing side portion. The handle portion, the leading side portion, the trailing side portion, and the heating subassembly-receiving base portion may define a passage extending through the housing cover. The electronics may be disposed within the proximal end of the housing cover and away from the heating subassembly-receiving base portion that may at least partially define the distal end of the housing cover.

Implementations of the disclosure may include one or more of the following optional features. In some implementations, the electronics include a first printed circuit board arranged perpendicular to a horizontal plane may be defined by the heating subassembly-receiving base portion; and a second printed circuit board arranged perpendicular to a horizontal plane may be defined by the heating subassembly-receiving base portion. The first printed circuit board may be at least partially disposed within the handle portion of the housing cover. The second printed circuit board may be at least partially disposed within the leading side portion of the housing cover. The first printed circuit board includes at least one of a power converter, an amplifier, or a rectifier.

The first printed circuit board may be connected to a power source. The second printed circuit board may include at least a controller that may be communicatively-coupled to one or more user-actuatable actuators arranged on an exterior surface of the housing cover. The second printed circuit board include at least a controller that may be communicatively-coupled to one or more indicators arranged on an exterior surface of the housing cover.

In some examples, the electronics may include at least one motion detection sensor communicatively-coupled to a controller that powers-off the electronics when the housing cover may be not moved for a period of time by a user. In other examples, the at least one motion detection sensor may be an accelerometer. In yet other examples, the electronics may include one or more tilt sensors communicatively-coupled to a controller that powers-off the electronics when the housing cover may be not tilted to a horizontal orientation by a user.

Each of the above independent implementations of the present disclosure, and those implementations described in the detailed description below, may include any of the features, options, and possibilities set out in the present disclosure and figures, including those under the other independent implementations, and may also include any combination of any of the features, options, and possibilities set out in the present disclosure and figures.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
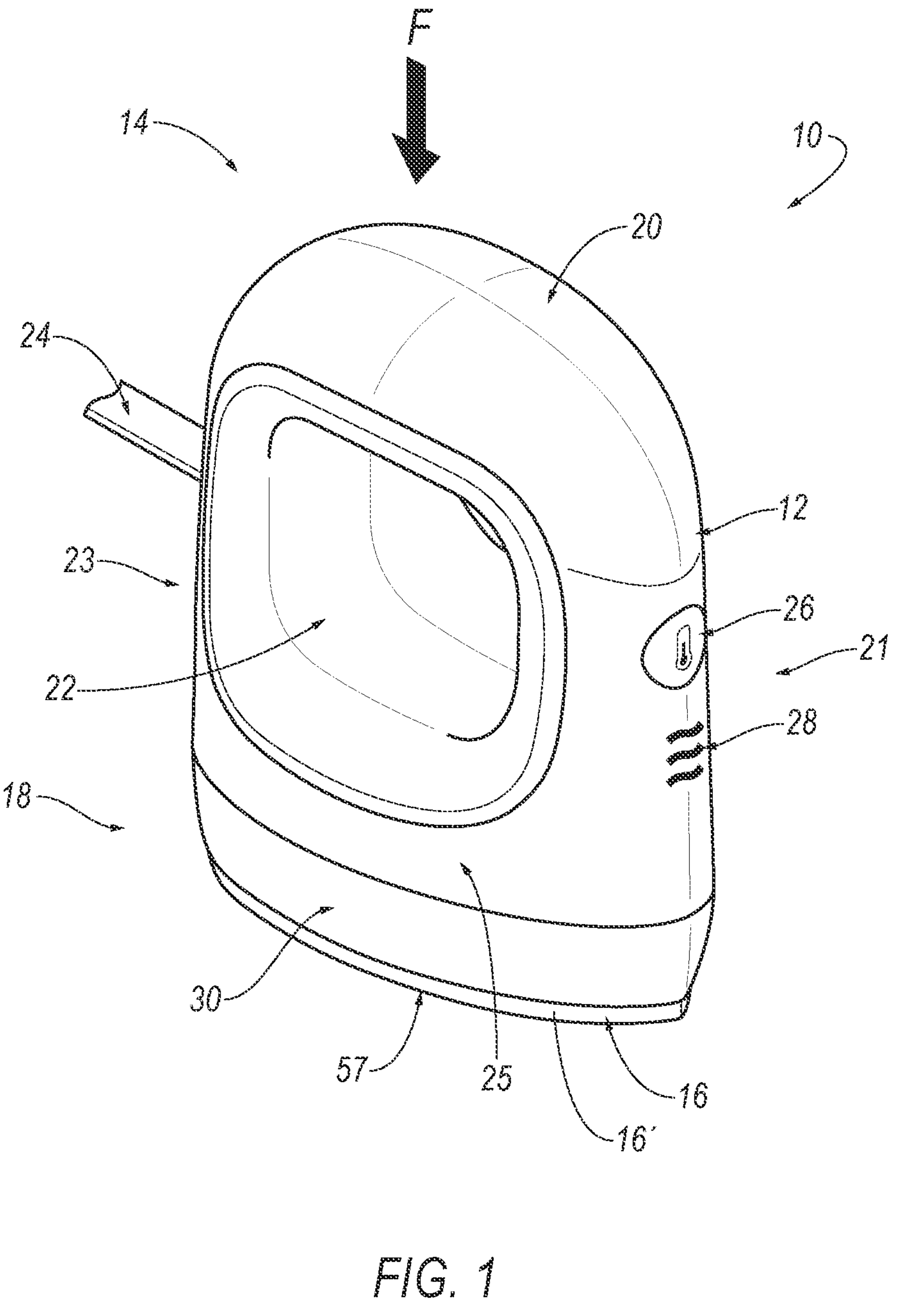
FIG. 1 is a perspective view of an exemplary heat press.
Figure 2:
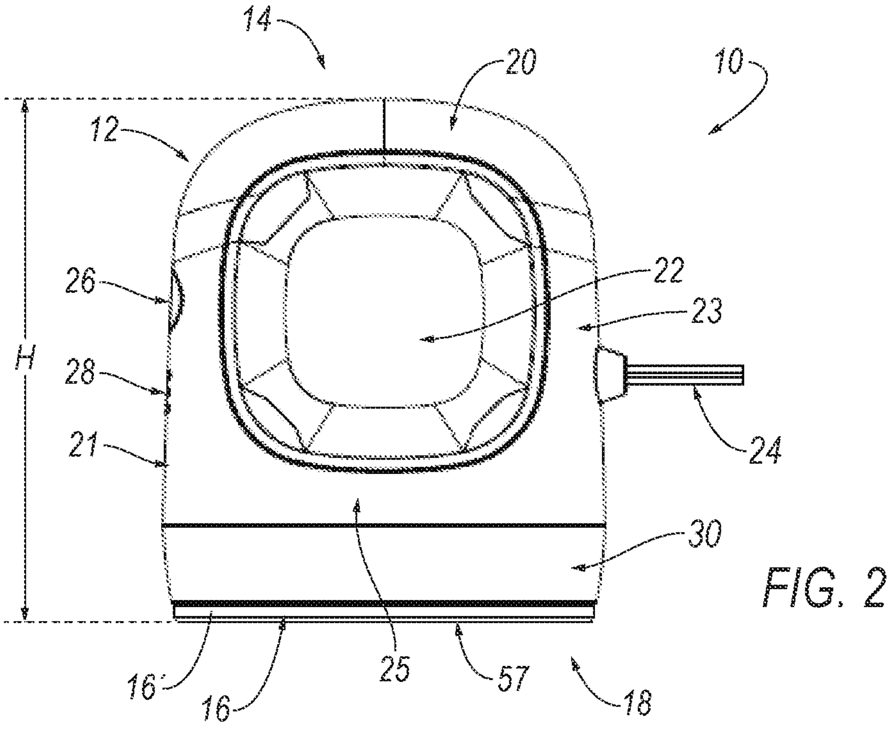
FIG. 2 is a first side view of the heat press of FIG. 1.
Figure 3:
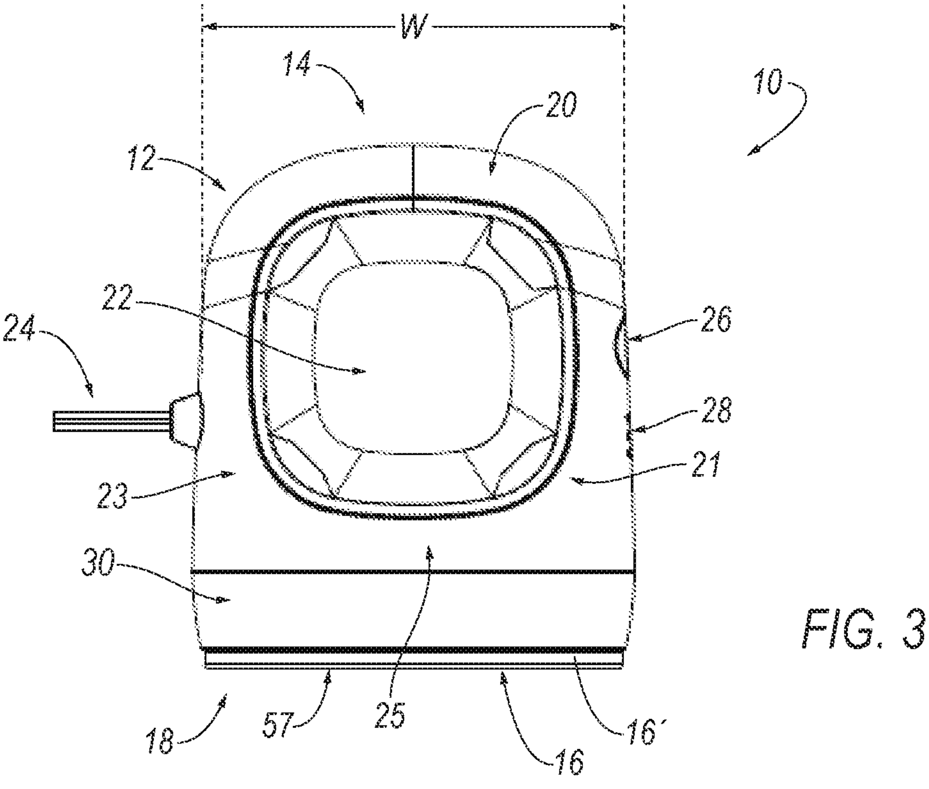
FIG. 3 is a second side view of the heat press of FIG. 1.
Figure 4:
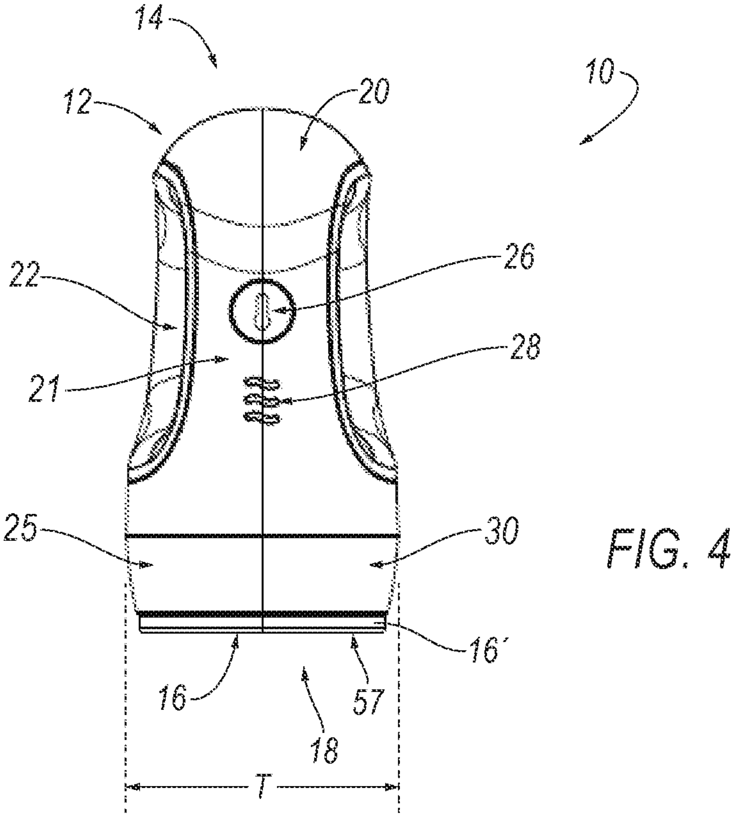
FIG. 4 is a front view of the heat press of FIG. 1.
Figure 5:
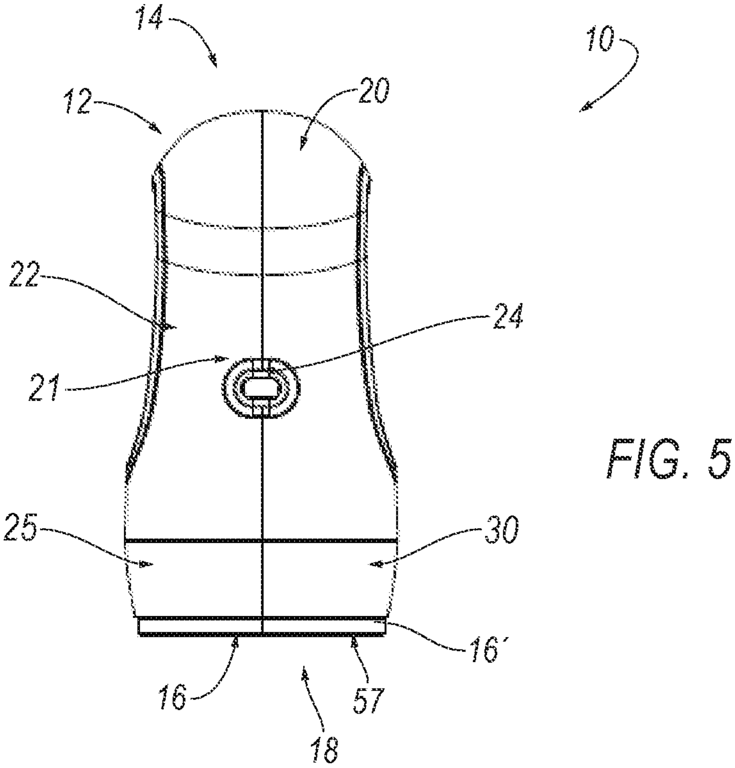
FIG. 5 is a rear view of the heat press of FIG. 1.
Figure 6:
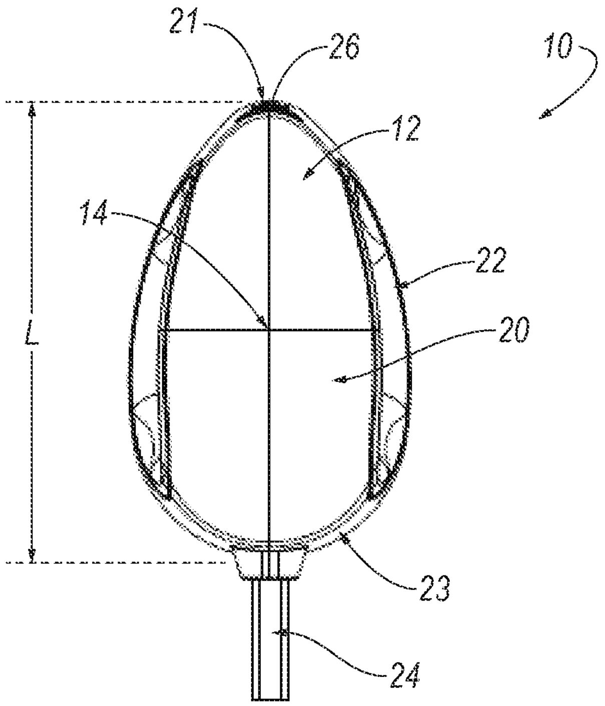
FIG. 6 is a top view of the heat press of FIG. 1.
Figure 7:
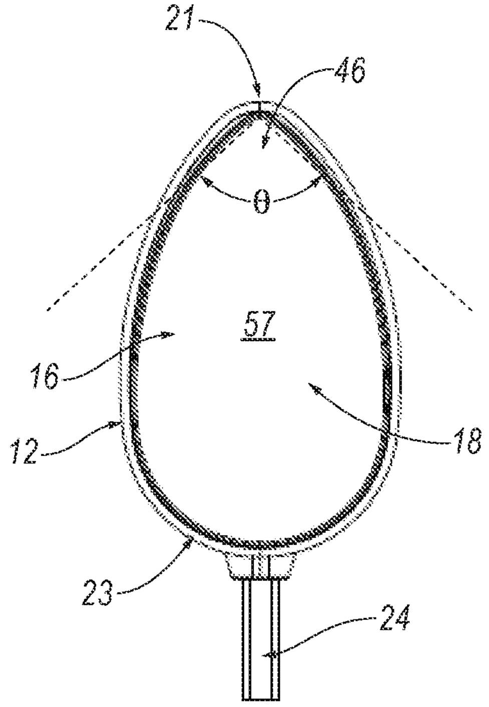
FIG. 7 is a bottom view of the heat press of FIG. 1.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

With reference to FIGS. 1-13, implementations of the present disclosure relate generally to an exemplary heat press 10, components thereof, and methods of use. Furthermore, as seen at FIGS. 14-22 the exemplary heat press 10 may be selectively supported by an exemplary heat press docking station base 52. In this regard, a heat press system 100 (see, e.g., FIGS. 15 and 19-22) may comprise the heat press 10 and the base 52. Some aspects described herein may be directed to a method of utilizing the heat press that may be utilized for the purpose of, for example, heat-activating an adhesive of a heat-activated design implement material (see, e.g., a heat-activated design implement material 225 at FIGS. 23A-23C) that may be utilized for crafting a workpiece (see, e.g., workpiece 250 at FIG. 23C and FIGS. 24A-24C) associated with crafting projects that are easily created and highly customizable before and after printing and/or cutting the heat-activated design implement material 225 with, for example processing equipment (see, e.g., a processing device 200 at FIGS. 23A-23C). When the heat-activated design implement material 225 is interfaced with the processing device 200 (see, e.g., FIG. 23B), the heat-activated design implement material 225 may be supported by a cutting mat 225' that may include fiducials.

In some configurations, the heat press 10 disclosed herein may be sized to be relatively small, compact, and portable in order to enable users U (see, e.g., FIGS. 24A-24C) to generate and apply heat to the heat-activated design implement 225 (see, e.g., FIGS. 23A-23C) in the course of heat-activating an adhesive of the heat-activated design implement material 225 when preparing arts-and-craft projects associated with correspondingly sized workpieces 250 such as, for example: t-shirts, hats; shoes (see, e.g., FIG. 24A); toys such as stuffed animals (see, e.g., FIG. 24B); pillows (see, e.g., FIG. 24C); jewelry; and the like. In some instances, the geometry, specific contours of various portions of the heat press 10 (including, for example a heat plate 16) permit precise heating applications for relatively small areas and/or abnormal surface contours of such heat-activated design implements 225 and/or workpieces 250.

In other instances, the heat press 10 may include electronics (e.g., power supply components, user interface components, temperature control components, and the like). In some configurations, the heat press 10 may include one or more materials that protect such electronic components from heat produced by the heat press 10.

In some examples, the heat press 10 provides sufficiently even heat distribution across the heat plate 16 to enable use thereof with, for example, arts-and-craft projects. In some instances, an aspect of the present disclosure provides even heat distribution to precision contours and geometries of the heat plate 16.

In some implementations, the heat press 10 provides temperature control of the heat plate 16 in order to maintain the temperature of the heat plate 16 rather than a fixed or predetermined temperature of the heat plate 16. Accordingly, control over the temperature of the heat plate 16 may provide for sufficient heating of diverse materials forming the heat-activated design implement 225 and/or the workpiece 250 in order to ensure a consistent and desirable bonding of the heat-activated design implement 225 to the workpiece 250.

The terms "compact," "miniaturized," "small," "portable," or other similar terms used herein to describe the heat press 10 are not meant as limiting; rather, these terms are used in reference to other commercially available heat presses. As such, the heat press 10 may not be intended for use in large industrial applications that may otherwise have to be operated by specially trained individuals and manufacturers. Accordingly, the heat press 10 may be referred to as a compact, home-use consumer device that is light weight, portable, and easy to operate by an untrained person U.

For instance, by way of a non-limiting example, the heat press 10 may define: (1) a height H (see, e.g., FIG. 2) of about 3.5" to 5.0"; (2) a width W (see, e.g., FIG. 3) of about 3.0" to 4.0"; (3) a thickness T (see, e.g., FIG. 4) of about 1.5" to 3.0"; and (4) a length L (see, e.g., FIG. 6) of about 2.5" to 4.5". One or more other configurations of the heat press 10 may deviate from any or all of the above-referenced dimension while remaining a portable, light weight, consumer-friendly device that may be utilized in a variety of arts-and-craft applications.

With reference to FIGS. 1-7, the heat press 10 may include a housing cover 12 joined to a heat plate 16. The housing cover 12 may at least partially define a first or proximal end 14 of the heat press 10, and the heat plate 16 may at least partially define a second or distal end 18 of the heat press 10.

The heat plate 16 may include any desirable base material (e.g., a metallic material), and, optionally, a ceramic coating 16' that may prevent material (e.g., one or a combination of the heat-activated design implement 225 and the workpiece 250) from sticking to heat plate 16 during use. Additionally, in some embodiments, the heat plate 16 may further optionally include, a clear protective coating 16' that mitigates failure of and/or prevents the ceramic coating 16' from structurally degrading and separating from the heat plate 16.

The housing cover 12 may be comprised of plastic materials, such as, for example, polycarbonate (PC), acrylonitrile butadiene styrene (ABS), a blend of PC and ABS, or the like. Such plastic materials may result in the housing cover 12 not melting when exposed to high temperatures, such as a temperature as high as, for example, 205° C. created by the heat plate 16 and/or deforming when, for example, external forces (according to the direction of arrow F seen at FIG. 1) or pressures are applied by a user U during the use of heat press 10.

As seen at FIGS. 1-5, the housing cover 12 may generally define a square-shaped or rectangular-shaped body that includes: a handle portion 20; a leading side portion 21; a trailing side portion 23; and a base portion 25 that collectively define a generally square-shaped or rectangular-shaped passage 22 extending through the housing cover 12. In some configurations, the handle portion 20 is disposed at or defines the first or proximal end 14 of heat press 10. Furthermore, the handle portion 20 may define an upper portion of housing cover 12. The passage 22 may define a space or be sized for permitting insertion of a user's fingers (see, e.g., FIGS. 24A-24C) such that the user's fingers may wrap around and grasp the handle portion 20 and subsequently impart a force F for applying pressure to one or both of the heat-activated design implement 225 and the workpiece 250 during use of the heat press 10. Thus, the configuration of handle portion and the passage 22 results in the user's fingers being spaced away from the second or distal end 18 of heat press 10 that is at least partially defined by the heat plate 16.

One or both of the housing cover 12 and the passage 22 may be shaped to define other forms or shapes without departing from the advantages provided thereby. For example, in other configurations, the cover may be shaped to define a substantially square-shaped passage 22 that may include rounded corners. Other configurations, the housing cover 12 may define a passage 22 having a circular shape, a triangular shape, a rectangular shape, a polygon shape, or other irregular shapes.

In addition, the size, shape, and specific configuration of housing cover 12 and handle portion 20 may vary in one or more other configurations without departing from the intended use of the heat press 10. For example, in some implementations, the upper portion of the housing cover 12 that forms the handle portion 20 may include finger contours or other gripping features that aids the user U in ergonomically grasping the housing cover 12.

In some examples, the heat press 10 may further include a power cord 24 that provides power to electrical components of the heat press 10. In some implementations, the power cord 24 provides power to temperature control components, user interface components, and/or other electronic components of the heat press 10. With reference to FIGS. 1-5, a user interface may include one or more buttons 26 and one or more temperature indicators 28 that are powered by power supplied from the power cord 24.

The one or more buttons 26 may be actuated (e.g., pressed) by a user U for powering on or powering off the heat press 10; in such instances, a visual indicator, such as, for example, a light source, may inform a user U when the heat press 10 is activated or deactivated. The one or more temperature indicators 28 may include one or more light sources that may, for example, communicate the temperature level and/or heat setting of the heat plate 16. In at least one embodiment, the one or more buttons 26 serve as both an on/off power button as well as a temperature setting button. In some instances, the one or more buttons 26 may be actuated in order to turn the heat press 10 on and then pressed again to set the temperature of heat plate 16. By actuating the one or more buttons 26, a low temperature setting, a medium temperature setting, or a high temperature setting may be selected by the user U, and, as explained above, the one or more light source indicators 28 may be illuminated in order to communicate to a user U a selected setting of the heat press 10. Subsequently, the one or more buttons 26 can then be actuated again in order to turn the heat press 10 off.

One will appreciate that the configuration, number, and shape of the one or more buttons 26 and temperature indicators 28 of one or more embodiments of the heat press may vary from that shown while still providing an easy to use, compact user interface for selectively operating and adjusting temperatures of the heat press 10.

Figure 8:
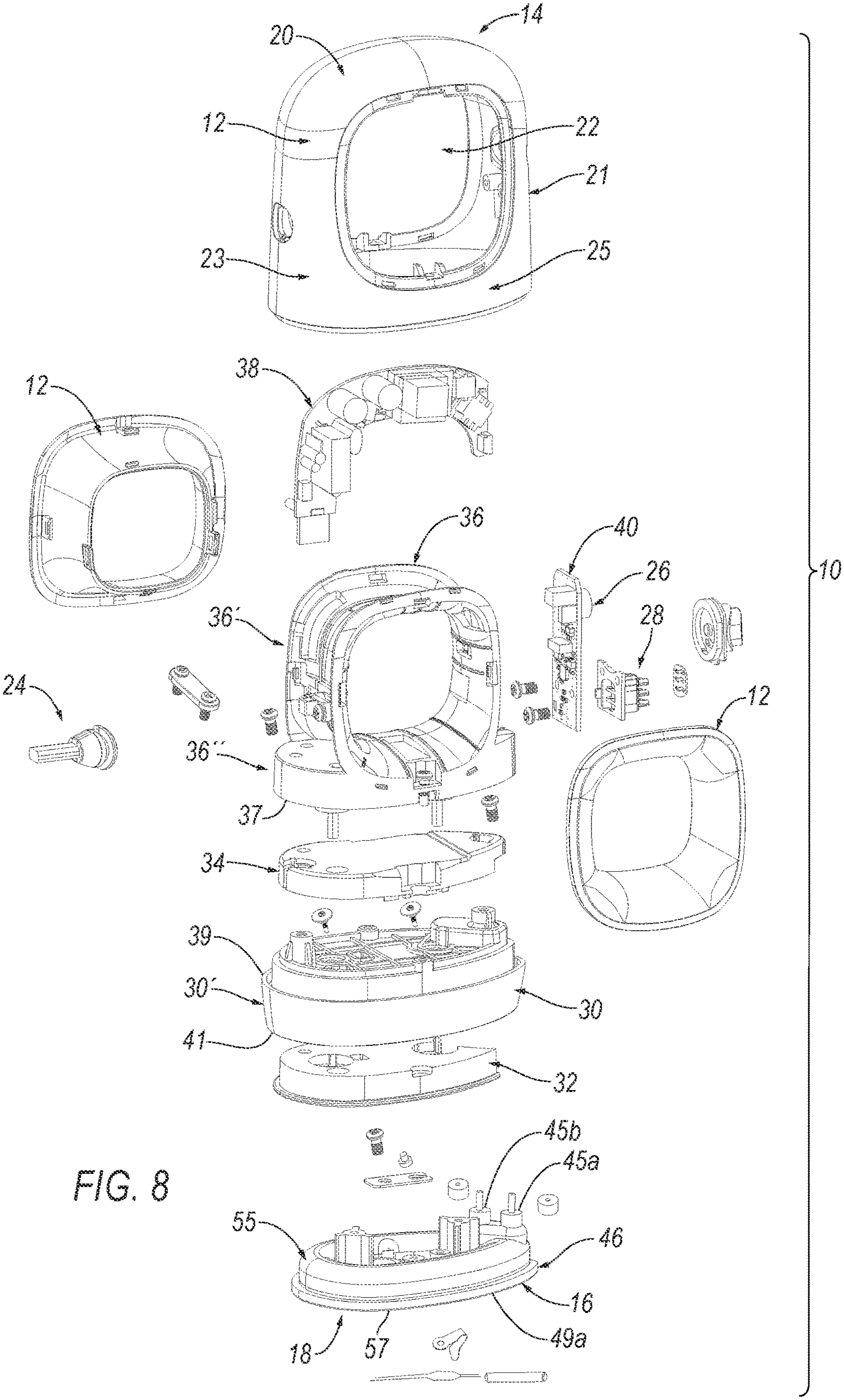
FIG. 8 is an exploded view of the heat press of FIG. 1.
Figure 9:
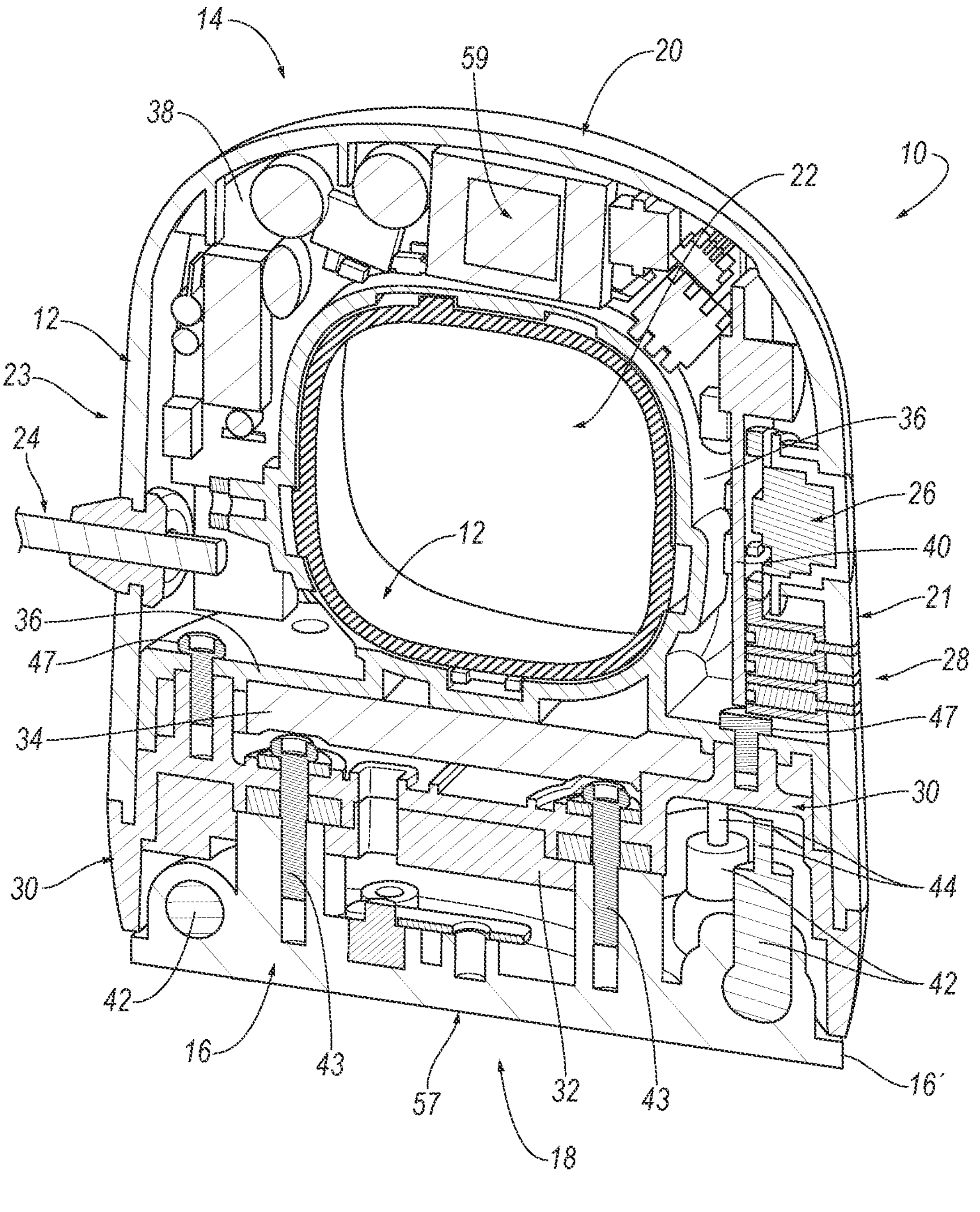
FIG. 9 is a cross-sectional view of the heat press according to line 9-9 of FIG. 1.

Referring to FIGS. 8-9, in addition to the heat plate 16, the second or distal end 18 of heat press 10 may also include an insulation base portion 30. The insulation base portion 30 extends between and connects the base portion 25 of the housing cover 12 to the heat plate 16. Furthermore, as comparatively seen at FIGS. 1 and 8, when the heat press 10 is assembled as seen at FIG. 1, a peripheral portion of both of the heat plate 16 and the insulation base portion 30 may be at least partially exposed to ambient air or the surrounding environment while an upper portion of the heat plate 16 is disposed adjacent and contained by the insulation base portion 30 and an upper portion of the insulation base portion 30 is contained by the base portion 25 of the housing cover 12.

In some configurations, the insulation base portion 30 includes an insulating material that prevents heat from the heat plate 16 from thermally transferring in a direction toward the handle portion 20 of the housing cover 12. In addition, the insulation base portion 30 may include one or more materials that are rigid and durable enough in order to transfer one or more forces F applied by the user U in a direction from the handle portion 20 toward the heat plate 16. In some instances, the insulation base portion 30 includes a polyphenylene sulfide (PPS) material. In other instances, the insulation base portion 30 may include one or more other durable, insulating materials, such as, for example, polypropylene carbonate (PPC) that may include a glass fiber insulation, or a combination thereof.

With reference to FIGS. 8-13, various internal features and components of the heat press 10 are shown. The features and components of the heat press 10 may each individually, collectively, or in any combination, be incorporated into or with the various embodiments of the heat press 10 described herein.

With reference to FIG. 8, internal components of the heat press 10 may include, for example: the heat plate 16, a heating coil 42, a first insulation layer 32, the insulation base portion 30, a second insulation layer 34, a pressure or force deflector 36, a first printed circuit board (PCB) 38, a second PCB 40, and the housing cover 12.

As seen at FIG. 9, the various components seen at FIG. 8 are assembled together within and/or about the housing cover 12. With reference to both FIGS. 8 and 9, the heat press 10 may include the first insulation layer 32 disposed between and connecting an upper surface or region of the heat plate 16 to a lower surface or region the insulation base portion 30. Additionally or alternatively, in some configurations, the heat press 10 includes the second insulation layer 34 disposed between and connecting an upper surface or region of the insulation base portion 30 to a lower surface or region of the pressure or force deflector 36. Furthermore, in some configurations, the first PCB 38 and the second PCB 40 are separated from the heat plate 16 by one or more of the first insulation layer 32, the second insulation layer 34, and the insulation base portion 30 thereby protecting electronic components situated on the first PCB 38 and the second PCB 40 from heat during use of the heat press 10.

The first insulation layer 32 and the second insulation layer 34 may include any number of suitable insulating materials, including, but not limited to, for example: nylon with glass fibers, other insulating materials, such as, for example, a microporous fiber insulation material, an aerogel, or the like, or combinations thereof. At least one aspect of the separate insulation layers defined by, for example, the first insulation layer 32 and the second insulation layer 34 provide softer materials that may have more effective insulating properties than other rigid materials described herein, such as materials defined by, for example, the insulation base portion 30 and/or the housing cover 12, but which are situated between various components, such as, for example, the heat plate 16, the insulation base portion 30, and the pressure or force deflector 36 such that the softer insulation layers defined by, for example, the first insulation layer 32 and the second insulation layer 34 can insulate the electronic components and the handle portion 20 from heat without needing to absorb any forces F from the user U that are translated to the handle portion 20, the pressure or force deflector 36, the insulation base portion 30, and then to the heat plate 16.

In addition, the multi-layer configuration of the insulation base portion 30, the first insulation layer 32 and the second insulation layer 34 (including any empty spaces or air gaps there-between), provides additive insulation properties to effectively prevent heat from being transferred from the heat plate 16 to the electronic components on the first PCB 38 the second PCB 40, and/or the handle portion 20 where a user grips the housing cover 12. Such configurations may contribute to accomplishing a relatively small profile of the heat press 10 where various components of the heat press 10 are tightly packed together.

In some configurations, the first insulation layer 32, the second insulation layer 34 and the insulation base portion 30 maintain the housing cover 12 and components therein at less than or equal to about 50° C. when a temperature of the heat plate 16 is equal to or greater than about 200° C. In other configurations, the first insulation layer 32, the second insulation layer 34, and the insulation base portion 30 maintain the housing cover 12 and components therein equal to about 50° C. when a temperature of the heat plate 16 is equal to about 205° C.

As described above, during use, a user will apply a force F to the handle portion that is subsequently transmitted through the pressure or force deflector 36, and then through the insulation base portion 30, and then to the heat plate 16. This transfer of forces F through the pressure or force deflector 36 and the insulation base portion 30, spares the remaining portion of the housing cover 12 (e.g., a portion not comprising the handle portion 20, the leading side portion 21, the trailing side portion 23, and/or the base portion 25, one or more of which may be made of a weaker material or a material with lower melting temperatures than that of the pressure or force deflector 36 and/or the insulation base portion 30) from transferring or otherwise being subject to too much force F or stress during use. Along these lines, with reference to FIG. 10, a cross-sectional view of an exemplary configuration of the pressure or force deflector 36 and the insulation base portion 30 isolated from other components of heat press 10 is shown.

In one respect, because the insulation base portion 30 transfers forces F to the heat plate 16 during use, the insulation base portion 30 may be considered part of the pressure or force deflector 36 such that the insulation base portion 30 forms a lower portion thereof and the pressure or force deflector 36 forms an upper portion thereof. In this way, in some configurations, the insulation base portion 30 serves both an insulation function and a structural function.

Figure 10:
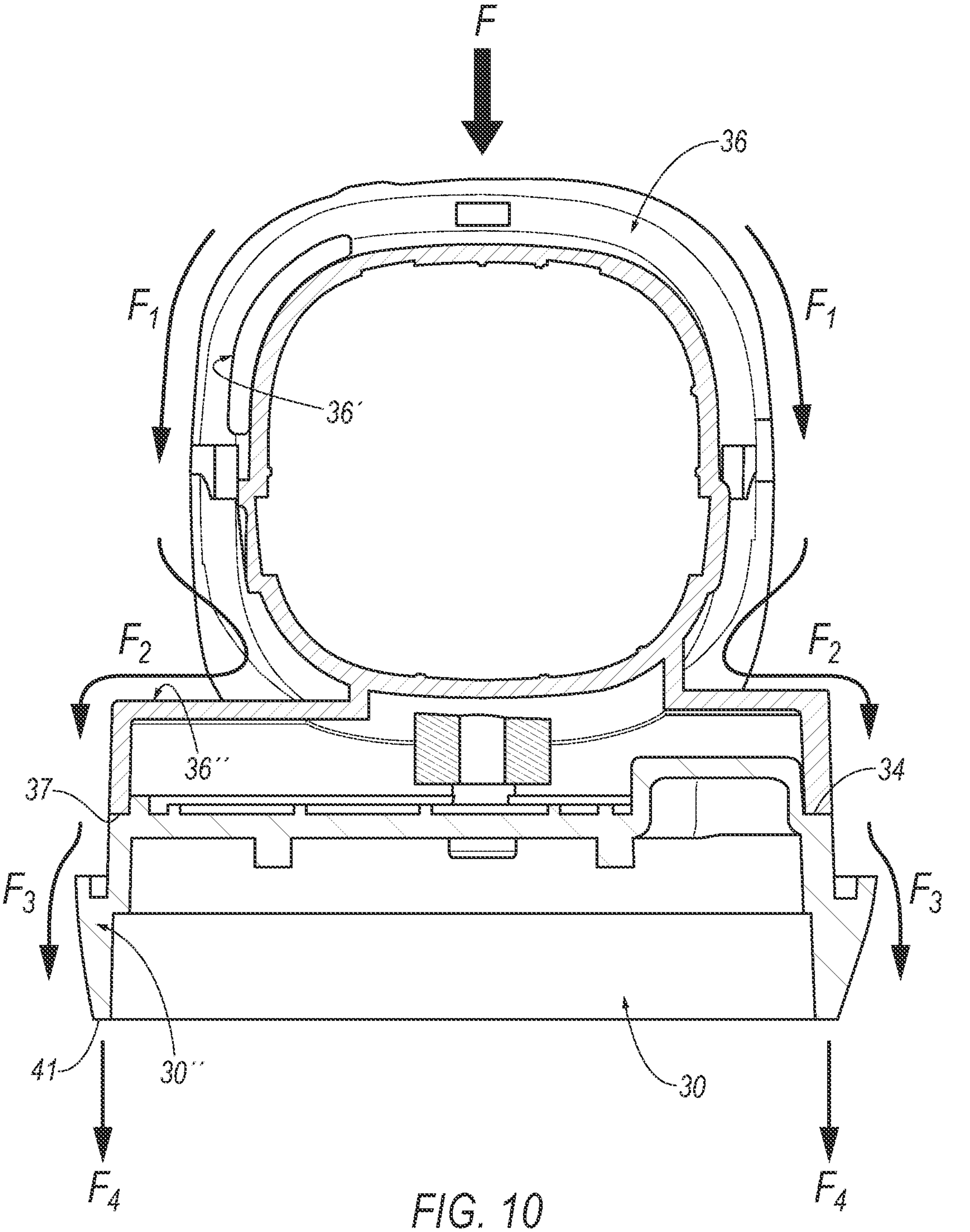
FIG. 10 is a cross-sectional view of a deflector of the heat press of FIG. 9.

In some configurations, as seen at FIG. 10, the pressure or force deflector 36 comprises an upper handle portion 36' and a lower bowl-shaped portion 36". A downwardly-facing lip 37 of the lower bowl-shaped portion 36" of the pressure or force deflector 36 mates with a peripheral upwardly-facing ledge surface 39 that defines a portion of an upper surface of the insulation base portion 30. Similarly, the insulation base portion 30 may comprise a lower bowl-shaped portion 30" having a downwardly-facing lip 41. Accordingly, when a user U imparts a force F to the heat press 10, the force F is transmitted: (1) through the handle portion 36' of the pressure or force deflector 36 according to the direction of arrows $F_1$; (2) then through the lower bowl-shaped portion 36" of the pressure or force deflector 36 exiting at the downwardly-facing lip 37 of the lower bowl-shaped portion 36" according to the direction of arrows $F_2$; (3) then into the peripheral upwardly-facing ledge surface 39 of the lower bowl-shaped portion 30" of the insulation base portion 30 and peripherally through the insulation base portion 30 according to the direction of arrows $F_3$; and (4) peripherally out of the downwardly-facing lip 41 of the lower bowl-shaped portion 30" of the insulation base portion 30 according to the direction of arrows $F_4$ such that the force F (according to the direction of arrows $F_4$) may be peripherally received by the heat plate 16.

In some embodiments, the upper handle portion 36' of the pressure or force deflector 36 circumscribes the passage 22. Furthermore, the upper handle portion 36' of the pressure or force deflector 36 extends through: the handle portion 20, the leading side portion 21, the trailing side portion 23, and the base portion 25. In other implementations, the pressure or force deflector 36 circumscribes the passage 22 while the downwardly-facing lip 37 of the lower bowl-shaped portion 36" of the pressure or force deflector 36 is in direct contact with or disposed adjacent the peripheral upwardly-facing ledge surface 39 that defines a portion of an upper surface of the insulation base portion 30. With reference to FIG. 9, the insulation base portion 30 may be connected to the heat plate 16 at one or more locations with one or more fastening means such as, for example, screws 43. Similarly, in some configurations, the pressure or force deflector 36 may be connected to the insulation base portion 30 at one or more locations with one or more fastening means such as, for example, screws 47.

Figure 11:
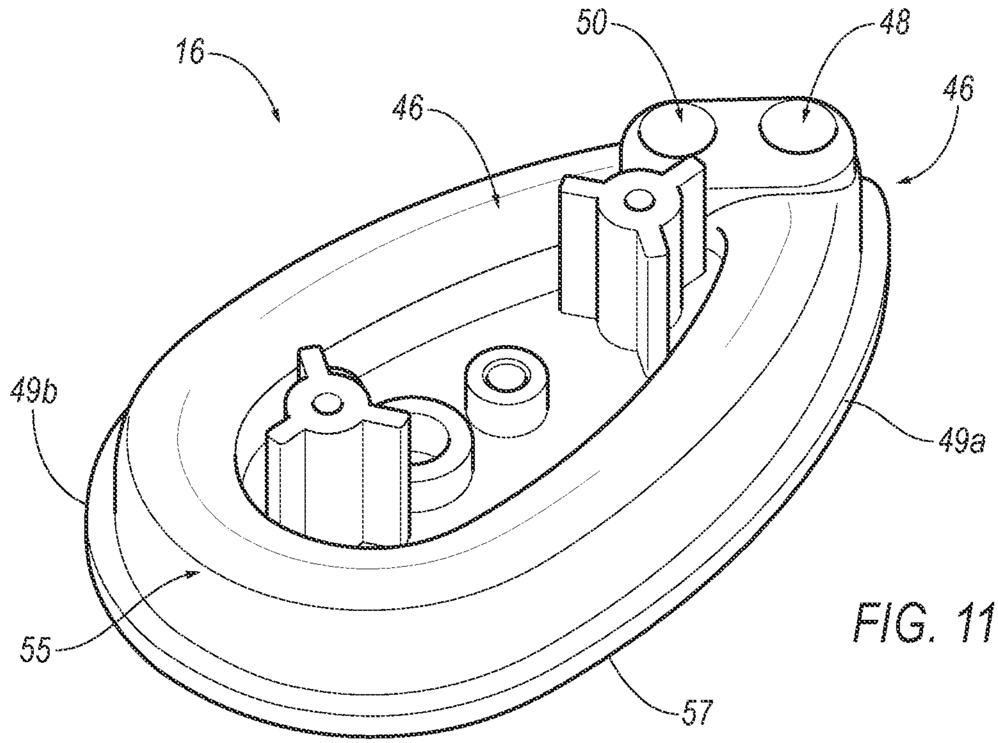
FIG. 11 is a perspective view of a heat plate of the heat press of FIG. 1.
Figure 12:
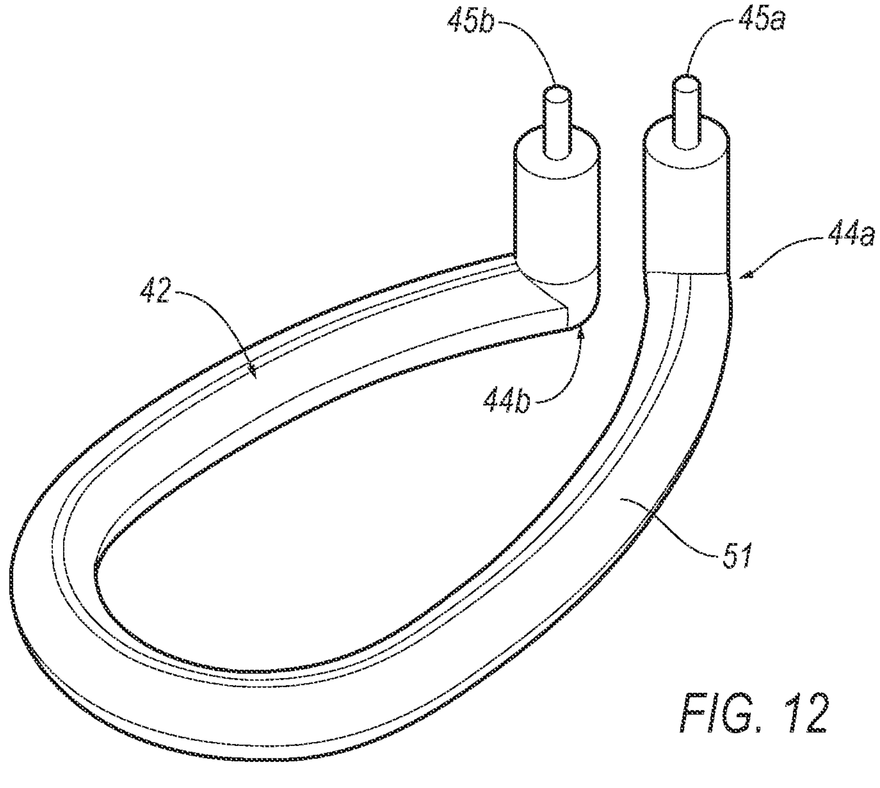
FIG. 12 is a perspective view of a heating coil of the heat press of FIG. 1.

An exemplary configuration of the heating coil 42 is seen at FIG. 12. With continued reference to FIG. 9 (and as also seen at FIG. 11), the heat plate 16 may be sized for receiving and/or containing the heating coil 42. With reference to FIGS. 9 and 12, the power cord 24 may supply electric current to the heating coil 42 by way of a first terminal 45*a* (that may extend substantially perpendicularly from a first end 44*a* of the heating coil 42) and a second terminal 45*b* (that may extend substantially perpendicularly from a second end 44*b* of the heating coil 42); accordingly, the heating coil 42 may comprise a resistive heater. Furthermore, the heating coil 42 may increase or decrease the temperature of the heat plate 16 as more or less electric current is provided to the heating coil 42 via the first terminal 45*a* and the second terminal 45*b*.

Figure 13:
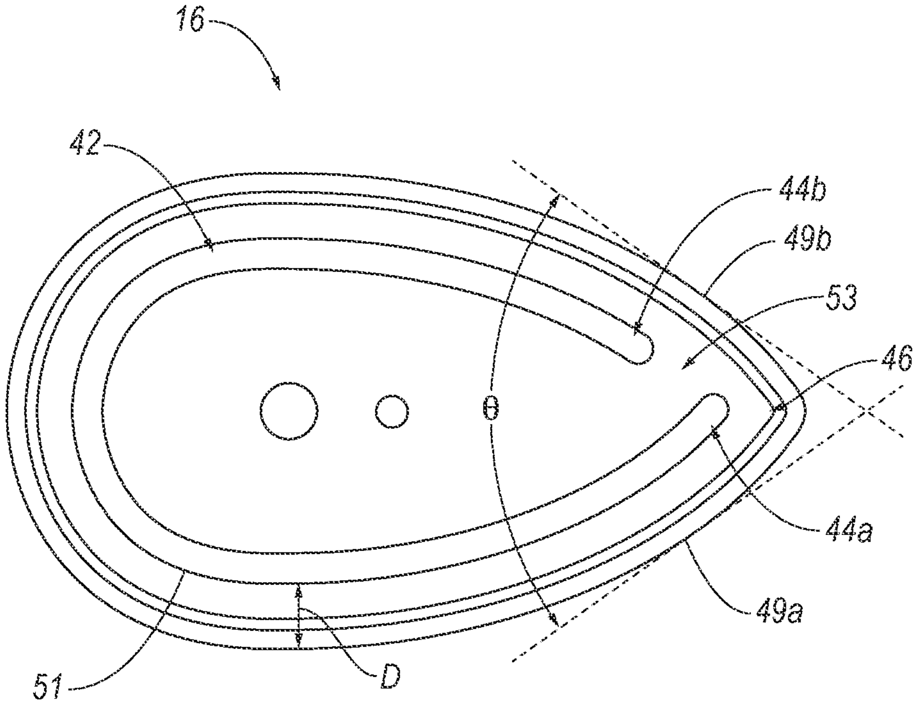
FIG. 13 is a view of a subassembly of the heat press of FIG. 1 including the heating coil of FIG. 12 arranged relative to the heat plate of FIG. 11.
Figure 14:
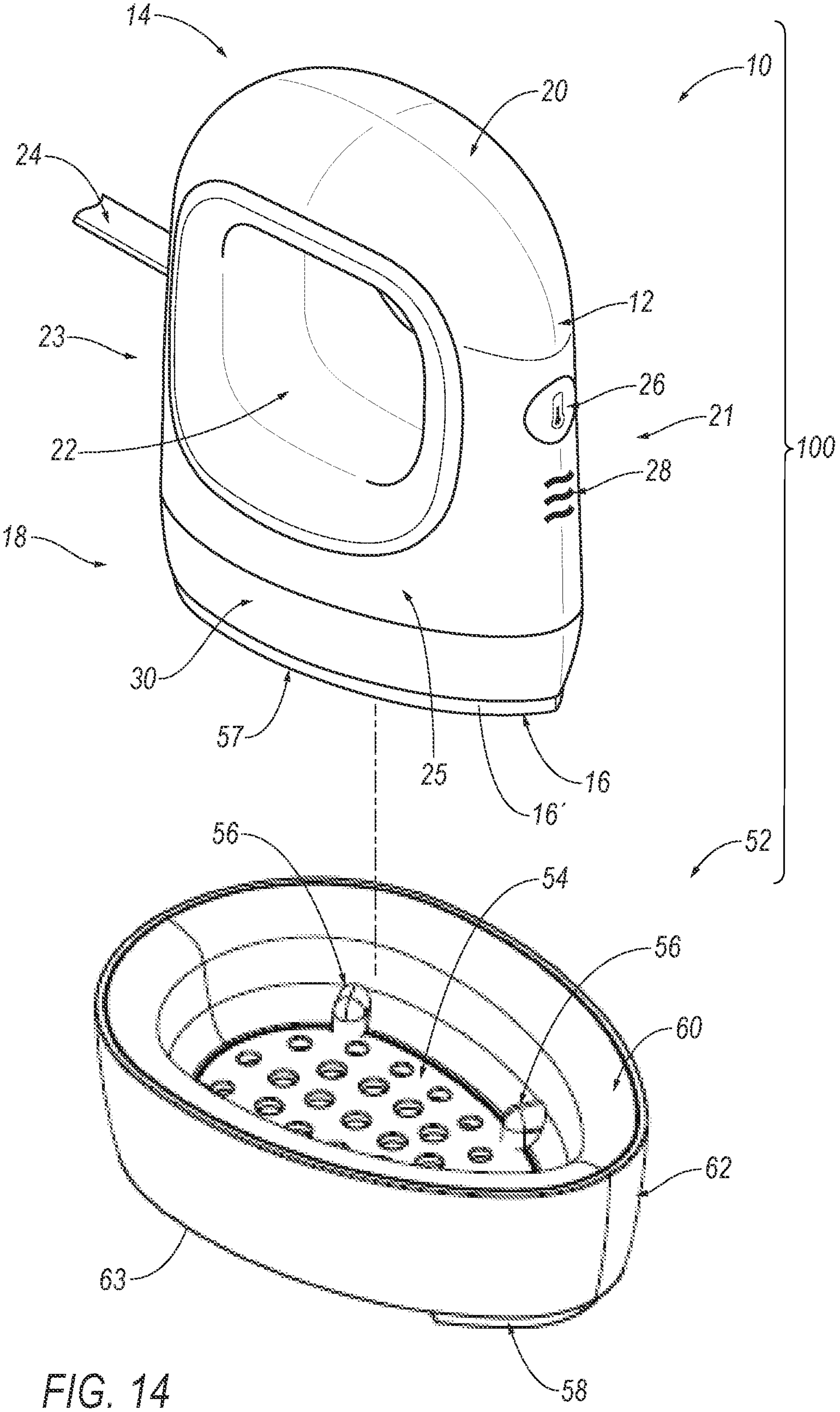
FIG. 14 is an exploded perspective view of a heat press system including an exemplary heat press docking station base that is sized for receiving the heat press of FIG. 1.
Figure 15:
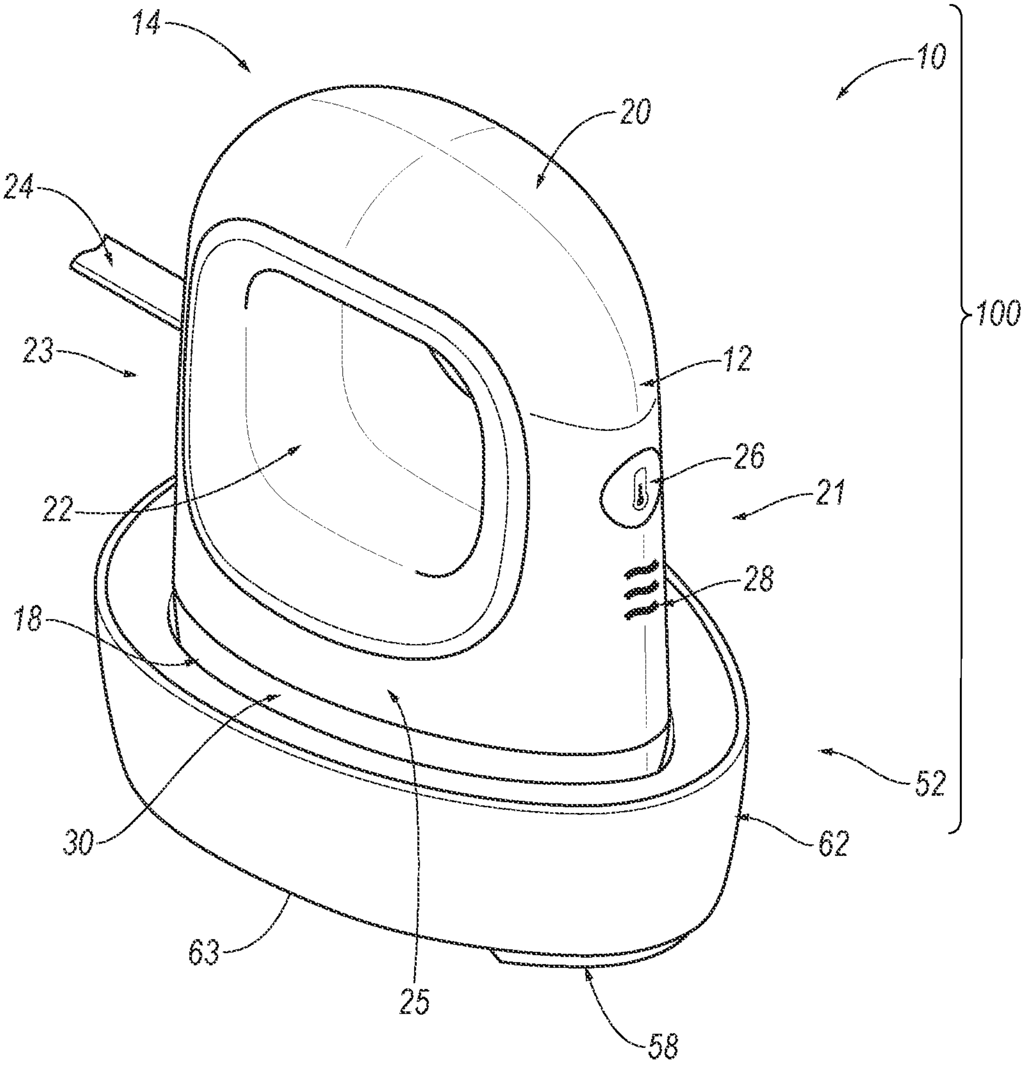
FIG. 15 is an assembled perspective view of the heat press system of FIG. 14 including the heat press received by and arranged in a stowed orientation relative the heat press docking station base.
Figure 16:
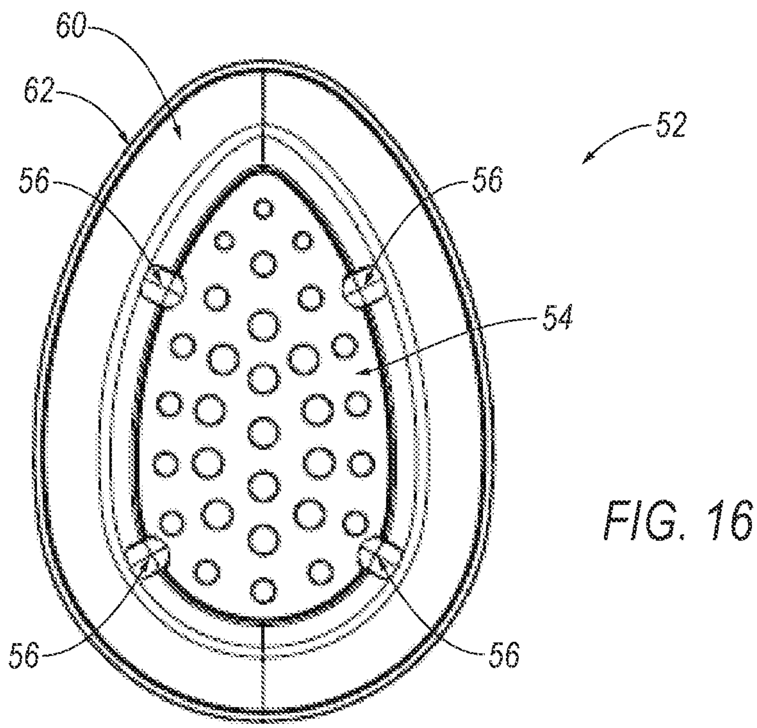
FIG. 16 is a top view of the heat press docking station base of FIG. 14.
Figure 17:
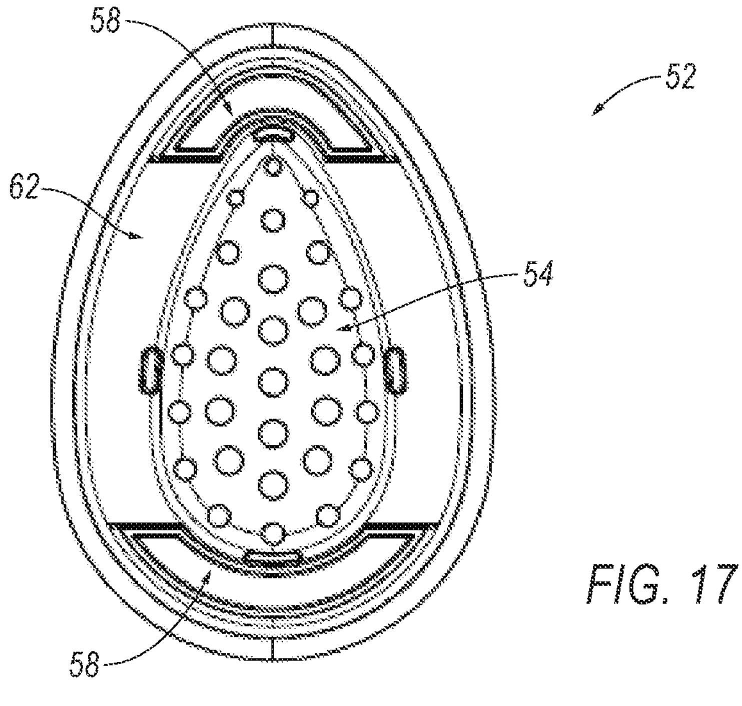
FIG. 17 is a bottom view of the heat press docking station base of FIG. 14.
Figure 18:
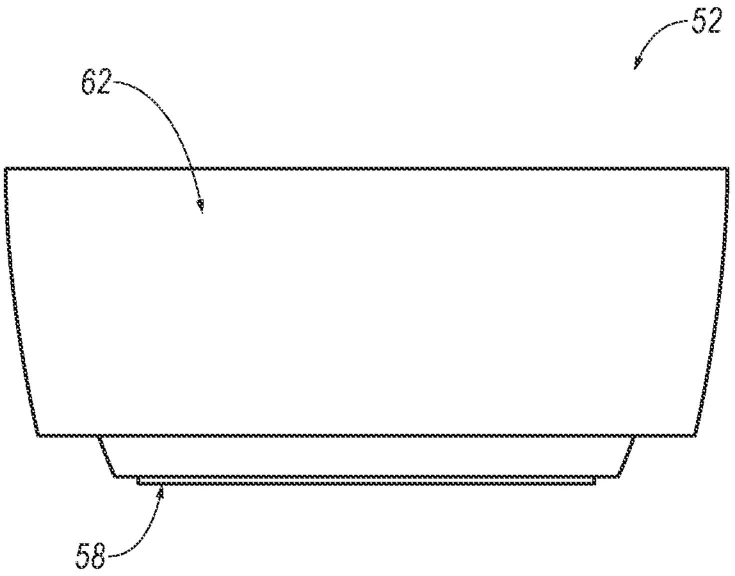
FIG. 18 is a rear view of the heat press docking station base of FIG. 14.
Figure 19:
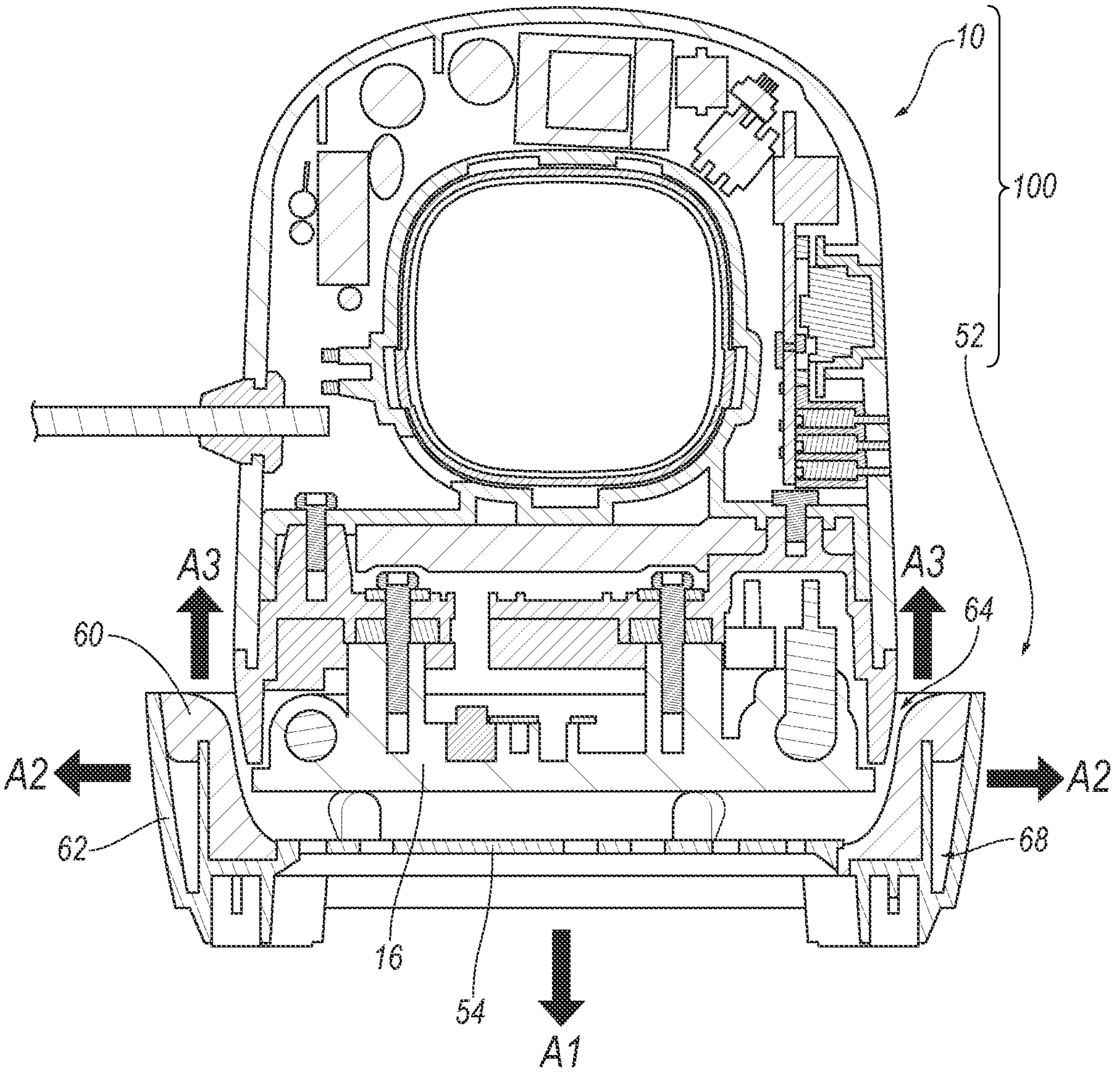
FIG. 19 is a cross-sectional view of the heat press system of FIG. 15.
Figure 20:
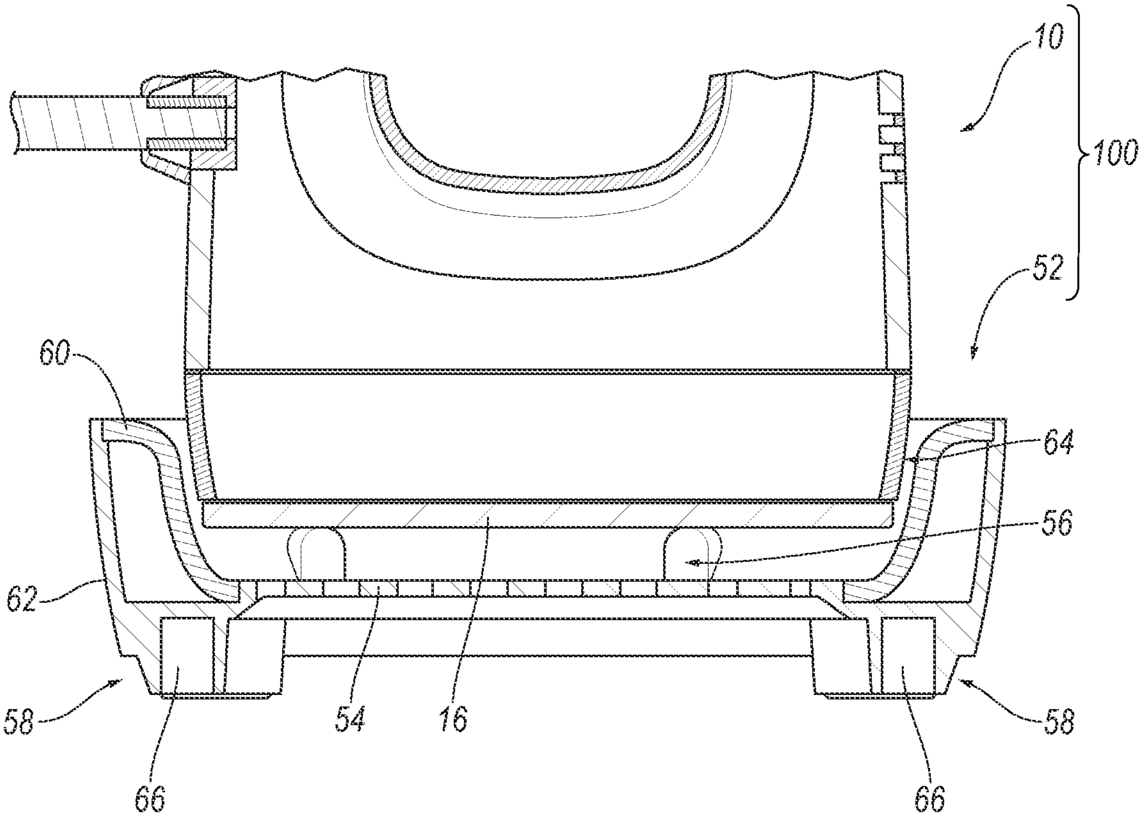
FIG. 20 is an enlarged cross-sectional view of the heat press system according to line 20 of FIG. 19.

As seen at FIG. 13, in some configurations, the heating coil 42 may be disposed adjacent to at least a portion of a surface of the heat plate 16. In some instances as seen at, for example, FIG. 11, the heat plate 16 is formed in a tear-drop shape, comprising a precision tip 46. The precision tip 46 provides a portion of the heat plate 16 that can be pressed against small, abnormal features and contours of a variety of workpieces 250 such as, for example, t-shirts, shoes, jewelry, hats, shoes (see, e.g., FIG. 24A); toys such as stuffed animals (see, e.g., FIG. 24B); pillows (see, e.g., FIG. 24C); or any other small fabric items in order to provide such workpieces 250 with a sufficient exposure to heat from the heat plate 16 in order to, for example, successfully execute iron-on crafting projects defined by the heat-activated design implement 225 bonded to the workpiece 250.

With reference to FIGS. 11 and 13, in some configurations, the precision tip 46 includes a first outer peripheral edge 49*a* and a second outer peripheral edge 49*b* of the heat plate 16 forming an angle θ (see, e.g., FIG. 13). The angle θ may range between about 10° and 120°. Accordingly, the precision tip 46 defined by the angle θ enables crafters U to sufficiently access small features of a variety of workpieces 250 such as, for example, t-shirts, hats, shoes (see, e.g., FIG. 24A); toys such as stuffed animals (see, e.g., FIG. 24B); pillows (see, e.g., FIG. 24C); shoes, jewelry and other common, small, fabric items in order to provide sufficient exposure to heat from the heat plate 16.

Although not shown in the Figures, in some configurations, the heat plate 16 may include more than one precision tip 46 or other features forming angles in the range noted above along the edge of the heat plate 16; for example, in some instances, the heat plate 16 may include two, three, four, or more than four precision tip portions 46. Although exemplary implementations of the heat plate 16 are described above to include one or more precision tips 46, the heat plate 16 is not limited to any one configuration, and, as such, the heat plate may be defined by other shapes.

With continued reference to FIG. 13, the heating coil 42 is configured to provide heat to the precision tip 46 as well as even heating across the heat plate 16. The heat plate 16 and the heating coil 42 are represented at FIG. 13 in an exemplary configuration in order to illustrate how the heating coil 42 is oriented on the tear-drop shaped heat plate 16. Accordingly, the heating coil 42 include a tube-shaped body extending between the first end 44*a* and the second end 44*b* that is curved or otherwise formed into a corresponding tear-drop shape that is sized for being received or contained by the heat plate 16. In some configurations, the first end 44*a* of the heating coil 42 contacts or may be disposed upon a surface of the heat plate 16 at region or area of the heat plate 16 that defines the precision tip 46.

In some configurations, the heating coil 42 may be configured such that an outer peripheral surface 51 (see, e.g., FIG. 12) of the heating coil 42 is equally spaced away from the first and second outer peripheral edges 49*a*, 49*b* of the heat plate 16 at a peripheral distance D (see, e.g., FIG. 13); in such an exemplary implementation, the second end 44*b* of the heating coil 42 may terminate near the first end 44*a* of the heating coil 42, which may be located at or near a region of the heat plate 16 defining the precision tip 46. Accordingly, in this exemplary implementation, the heating coil 42 may originate at the precision tip 46 and extend along the first and second outer peripheral edges 49*a*, 49*b* of the heat plate 16 so that precision tip 46 is heated evenly by the heating coil 42 along with the rest of the heat plate 16. As a result, the second end 44*b* of the heating coil 42 terminates at or near where the heating coil 42 originates from (i.e., as defined by the first end 44*a* of the heating coil 42); however, the first end 44*a* and the second end 44*b* of the heating coil 42 remain separated, defining a gap 53 there-between in order to avoid electrical shorting of the heating coil 42. In particular, the second end 44*b* may face the first end 44*a*, while the first end 44*a* may face the second outer peripheral edge 49*b* of the heat plate 16.

In some implementations, the heating coil 42 is associated with, electrically coupled to, and/or communicatively coupled to a controller comprising temperature control electronics. The controller may be a component of one or both of the PCBs 38, 40. Accordingly, a user U may actuate one or more of the buttons 26 or a dial that will regulate or maintain control of the heat generated by the heat plate 16 such that the heat is evenly distributed across the heat plate 16 that will result in any surface portion of the heat plate 16 being within about ±2.0° C. or within about ±2.5° C. of a target or set temperature selected by the user U.

FIG. 11 illustrates a perspective view of an exemplary heat plate 16 that defines a heating coil enclosure portion 55. The heating coil enclosure portion 55 may further define an inlet opening 48 and an outlet opening 50. The heating coil enclosure portion 55 is sized for receiving and enclosing or housing the heating coil 42. The inlet opening 48 is sized for permitting passage of the first terminal 45*a* there-through that may extend substantially perpendicularly from the first end 44*a* of the heating coil 42; similarly, the outlet opening 50 is sized for permitting passage of the second terminal 45*b* there-through that may extend substantially perpendicularly from the second end 45*a* of the heating coil 42. With reference to FIG. 12, the tube-shaped body of the heating coil 42 may be about 7 mm in diameter and long enough to extend along the first and second outer peripheral edges 49*a*, 49*b* of the heat plate 16.

Referring back to FIG. 9, the first PCB 38 and the second PCB 40 are situated within the housing cover 12 to accommodate various electronic components within the tight space provided within the housing cover 12. In some instances, the first PCB 38 may include many of the power electronic components, such as, for example: power converters; amplifiers; rectifiers; and the like. In some configurations, the second PCB may include electronic components configured to, for example, operate a controller in view of one or more user inputs resulting from actuating the one or more buttons 26 that may, in turn, change an on state or an off state of the one or more indicators 28, which may be, for example, a temperature indicator. The PCB 40 may also include electronic components including, but not limited to: electrical switches; light emitting diode (LED) lights; and the like.

In order to position the PCBs 38, 40 within the small interior space of the housing cover 12, each PCB 38, 40 is positioned so that the major plane of each PCB 38, is perpendicular to a horizontal plane defined by an implement-contact heating surface 57 (see, e.g., FIG. 7) of the heat plate 16 (i.e., the PCBs 38, 40 are thus oriented vertically while the heat plate 16 is oriented horizontally). In some examples, at least a portion, if not all, of the first PCB 38 may be positioned within the handle portion 20 of housing cover 12 and the second PCB 40 may be positioned within the leading side portion 21 of the housing cover 12 as seen at, for example, FIG. 9.

Furthermore, in some configurations, the first PCB 38 and the second PCB 40 are oriented perpendicular to one another. In this way, as shown at, for example, FIG. 9, the second PCB 40 can be oriented toward the one or more buttons 26 and the temperature indicator 28 in order to accommodate the control thereof. Also, the first PCB 38 can be shaped so as to curve around the passage 22 while being at least partially disposed within the handle portion 20 while remaining planar along its major plane for ease of manufacturing and assembly.

In this way, the PCBs 38, 40 can be compactly positioned within the housing cover 12 to form a stand-alone heat press 10 that includes all necessary temperature control and user display electronics within the heat press 10. At the same time, as noted above the PCBs 38, 40 and associated electronic components are housed in the housing cover 12 above the first insulation layer 32, the second insulation 34, and the insulation base portion 30 for protection from heat that is generated by the heat plate 16. Furthermore, in some configurations, the heat press 10 may include at least one motion detection sensor 59 (see, e.g., FIG. 9), such as, for example, one or more accelerometers, that may be communicatively-coupled with one or more components of the PCBs 38, 40, such as, for example, a timer or clock, both of which may be connected to a processor of one or more of the PCBs 38, 40. In some instances, when, for example, a certain amount of time lapses without the at least one motion detection sensor 59 detecting motion imparted to the heat press 10 by the user U, the processor may send a signal that powers-off the heating coil 42. In some instances, the processor may automatically power off the heating coil 42 after, for example, thirteen (13) minutes of non-use or lack of motion as detected by the motion detection sensor 59. Such implementations with an automatic shutoff feature that may include a motion detection sensor 59 may be advantageous in embodiments of the heat press 10 that may include, for example, one or more of the PCBs 38, 40 that do not include a timer or processor that is pre-programmed with a shutoff time period that would otherwise power off the heating coil 42. In other configurations, the heat press 10 may alternatively include or also include one or more tilt sensors that may power on or power off the heating coil 42 (e.g., when the heat press 10 is tilted horizontally, the heating coil 42 is powered on, and, when the heat press 10 is tilted vertically in an upright orientation, the heating coil 42 is powered off).

FIGS. 14-18 illustrate a heat press docking station base 52 that supports the heat press 10 during use while heat plate 16 may or may not be hot. A user U may use the heat press docking station base 52 to periodically set heat press 10 down without turning the power off or waiting for heat plate 16 to cool. The heat press docking station base 52 provides a barrier between the implement-contact heating surface 57 of the heat plate 16 and a support surface or working surface, such as a counter, table 300 (see, e.g., FIGS. 23A-23C), desktop surface, or the like. Accordingly, the heat press docking station base 52 may comprise one or more insulating materials, such as, for example: a rubber material; a plastic material; and the like, which can withstand hot temperatures of the heat plate 16 while keeping the heat press 10 arranged at a distance away from the working surface 300 that supports the heat press docking station base 52. In some configurations, the heat press docking station base 52 may include a polyphenylene sulfide (PPS) material; a silicone material; other plastic materials; a rubber material; or any combination thereof.

In some examples, the heat press docking station base 52 can withstand instances of the heat plate 16 being heated to a temperature as high as, for example, 180° C. or more while maintaining the temperature of the working surface 300 at or below 90° C. In some configurations, the heat press docking station base 52 can withstand instances of the heat plate 16 being heated to a temperature as high as, for example, 200° C. or more while maintaining the temperature of the working surface 300 at or below 70° C.

With reference to FIGS. 14, 16-17, and 19-22, the heat press docking station base 52 may include a perforated floor 54 that promotes ambient air flow through the heat press docking station base 52 (see, e.g. airflow arrow A1 in FIG. 19) such that ambient air may cool the heat plate 16. Furthermore, as also seen at FIGS. 14, 16, and 19-22, the heat press docking station base 52 may also include one or more heat plate support protrusions 56 on which the implement-contact heating surface 57 of the heat plate 16 may be disposed adjacent in order to separate the implement-contact heating surface 57 of the heat plate 16 away from perforated floor 54 at a distance (see, e.g., arrow X at FIG. 21). Although the illustrated exemplary implementation of the heat press docking station base 52 includes four heat plate support protrusions 56, other implementations of the heat press docking station base 52 may include more or less than four heat plate support protrusions 56.

In some examples, the heat plate support protrusions 56 may be formed from one or more insulating materials that can withstand high temperatures from the heat plate 16. In addition, in some instances, the heat plate support protrusions 56 may include a smooth and/or flexible material that mitigates impairment of the structural integrity of the implement-contact heating surface 57 of the heat plate 16 when the heat plate 16 is placed thereon. In some examples, one or more heat plate support protrusions 56 may include a silicon material. In some configurations, the one or more heat plate support protrusions are axially connected to the perforated floor 54 and are radially connected to peripheral body shell portions 60, 62.

The combination of the connection of the perforated floor 54 and the peripheral body shell portions 60, 62 generally includes a nest portion 75 that is sized for matingly-receiving and containing at least a portion of the second or distal end 18 of heat press 10 defined by the heat plate 16. In other configurations, the peripheral body shell portions 60, 62 may extend at distance away from the perforated floor 54 such that the peripheral body shell portions 60, 62 extend over and is arranged opposite or adjacent at least a portion or all of the insulation base portion 30 of the second or distal end 18 of heat press 10.

Figure 21:
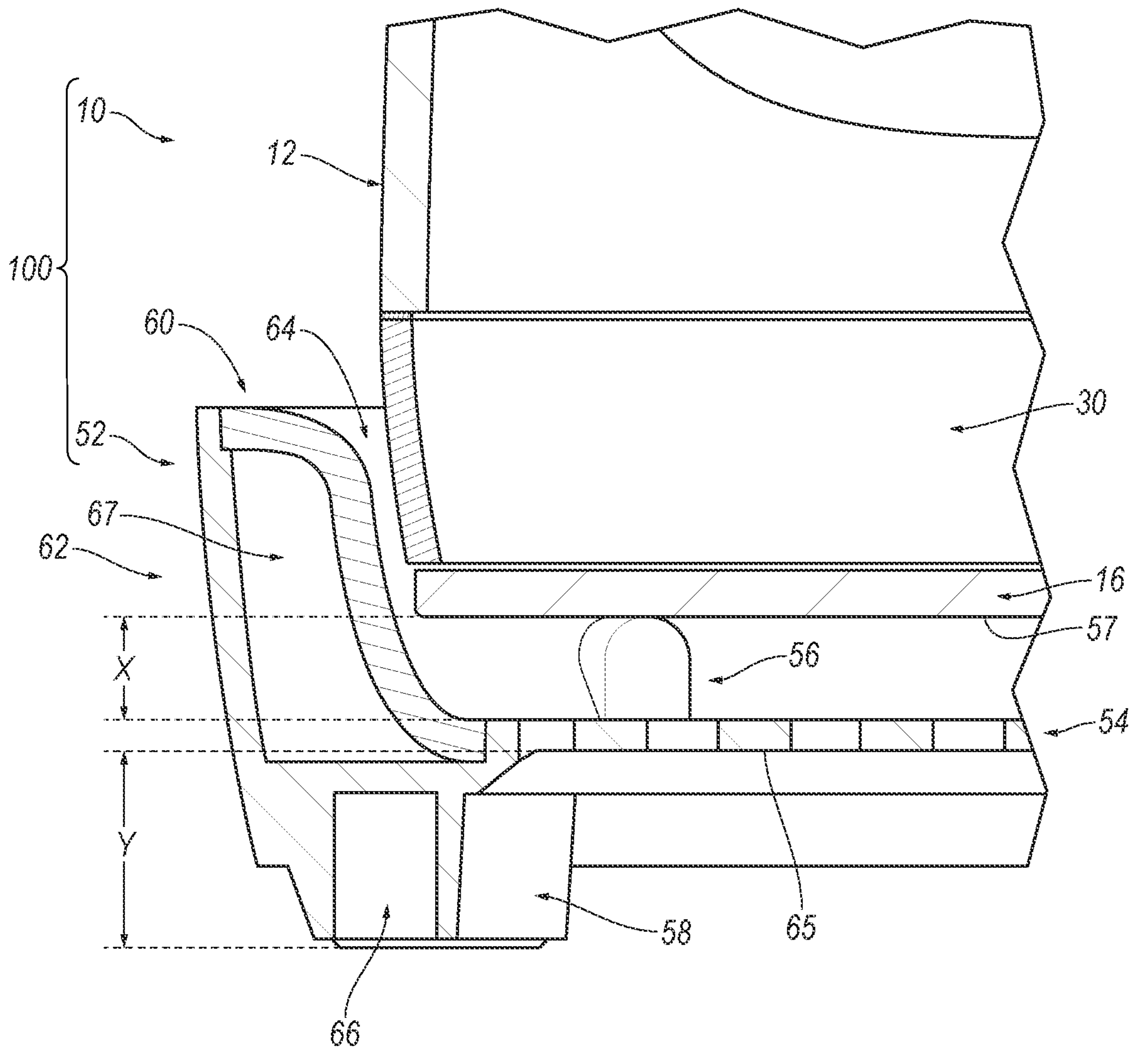
FIG. 21 is an enlarged view of FIG. 20.

In some implementations, one or more legs 58 may extend from a lower surface 63 (see, e.g., FIGS. 14-15 and 19-21 where the one or more legs 58 extend from one or both of the peripheral body shell portions 60, 62) of the heat press docking station base 52; with reference to FIG. 21, functionally, the one or more legs 58 may separate a lower surface 65 of the perforated floor 54 from implement-contact heating surface 57 of the heat plate 16 at a distance (according to arrow Y at FIG. 21). The separation distance Y 5 provided by the one or more legs 58 also promotes ambient airflow A1 (see, e.g., FIG. 19) through the perforated floor 54 for additional cooling of the heat plate 16. In some configurations, the one or more legs 58 are not axially aligned with the heat plate support protrusions 56 so that the heat plate support protrusions 56 are not disposed directly above the one or more legs 58 accordingly, any heat that is transferred from the heat plate 16 into heat plate support protrusions 56 does not transfer directly axially through the perforated floor and further axially downwardly into the one or more legs 58 and then further axially into the working surface 300 that supports the one or more legs 58. Rather, in such an non-axially-aligned configuration defined by the distance Z, any heat transferred from the heat plate 16 into 15 heat plate support protrusions 56 is more likely to be radially transferred into the perforated floor 54 and then further radially into peripheral body shell portions 60, 62 before being axially exposed to the one or more legs 58, thus further dissipating heat before it can be thermally transferred toward the working surface 300 by way of the one or more legs 58.

In addition, the various components of heat press docking station base 52 described herein, including, for example, the peripheral body shell portions 60, 62, the heat plate support protrusions 56, the perforated floor 54, and the one or more legs 58, may be formed separately and joined together during manufacturing, or, alternatively, they may be integrally formed, such as by molding or by another process. For example, in some configurations, the heat plate support protrusions 56 may be integrally formed with the perforated floor 54 and then joined with separate components such as, for example, the peripheral body shell portions 60, 62 and/or the one or more legs 58. Also, for example, the heat plate support protrusions 56 and one or more legs 58 may be formed separately from the rest of heat press docking station base 52 and subsequently joined together during manufacturing.

In addition, some configurations of the heat press docking station base 52 includes an inner peripheral body shell portion 60 and an outer peripheral body shell portion 62. The inner peripheral body shell portion 60 and the outer peripheral body shell portion 62 may be joined to form an interior space or gap 67 (see, e.g., FIGS. 19-22) between inner peripheral body shell portion 60 and the outer peripheral body shell portion 62. Such an interior space or gap 67 formed by the heat press docking station base 52 further insulates heat radiating radially outwardly according to the direction of the arrow A2 (see, e.g., FIG. 19) from the heat plate 16. In addition, such an interior space or gap 67 may be filled with a gas, such as, for example, air, or comprise a vacuum for enhanced insulation capabilities. In some examples, the peripheral body shell portions 60, 62 are separately formed then joined together. In other configurations, the peripheral body shell portions 60, 62 are integrally formed together as a single piece.

FIGS. 19-22 illustrate cross-sectional views of the heat press system 100 comprising the heat press 10 supported by the heat press docking station base 52. As illustrated, when the heat plate 16 of the heat press 10 is supported on the heat plate support protrusions 56, the heat press system 100 defines a gap 64 between an outer peripheral surface of the heat press 10 (that may be defined by, for example, one or more of a peripheral outer surface portion of one or a combination of the heat plate 16 and the insulation base portion 30) and an inner peripheral surface of the inner peripheral body shell portion 60. Functionally, the gap 64 promotes airflow according to the direction of arrow A3 (see, e.g., FIG. 19) to reduce heat transferred from the heat plate 16 to the working surface 300 on which the heat plate 16 of the heat press 10 is disposed adjacent the heat plate support protrusions 56 of the heat press docking station base 52.

While the width of the gap 64 may vary in one or more implementations of the heat press system 100, a width of the gap 64 may be between about 1 mm and 3 mm. In other configurations, the width of the gap 64 may between about 1.5 mm and 2 mm. In yet other configurations, the width of the gap 64 may be about 1.7 mm±10%. In some configurations, the inner peripheral body shell portion 60 may include a silicone material or one or more other heat resistant materials, such as, for example, silicon; furthermore, in such configurations, the heat plate support protrusions 56 may or may not be integrally formed with the inner peripheral body shell portion 60. In some implementations the outer peripheral body shell portion 62 may include a glass-filled nylon material, a PPS material, or the like.

Furthermore, as seen at FIGS. 19-22 one or more legs 58 may define inner cavities that are either hollow or filled with another heat resistant material insert such as, for example, a silicone insert 66 or other heat resistant material insert. In some instances, the silicone insert 66 contacts the working surface 300 on which heat press docking station base 52 rests so that the outer peripheral body shell portion 62 does not contact the working surface 300.

In some configurations, the one or more legs 58 may include an alternating material stack-up defined by the silicon inserts 66, a PPS material, or the outer peripheral body shell portion 62 formed from a glass-filled nylon material and/or the perforated floor 54 and the inner peripheral body shell portion 60 including a silicon material. Such a configuration may provide enhanced heat dissipation and absorption properties in order to maintain temperatures of the working surface 300 at an ambient temperature.

Figure 22:
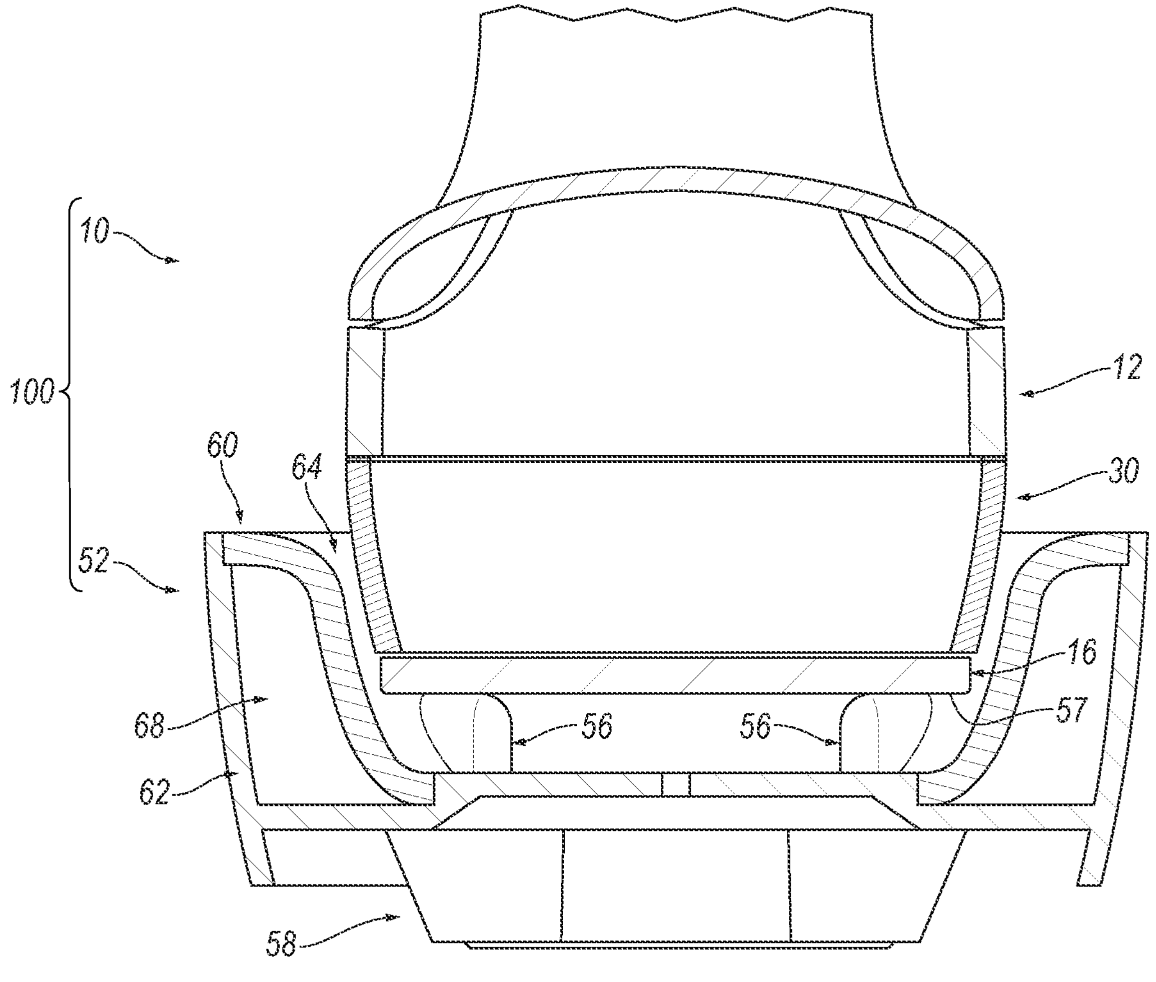
FIG. 22 is another enlarged cross-sectional view of the heat press of FIG. 20.
Figure 23A:
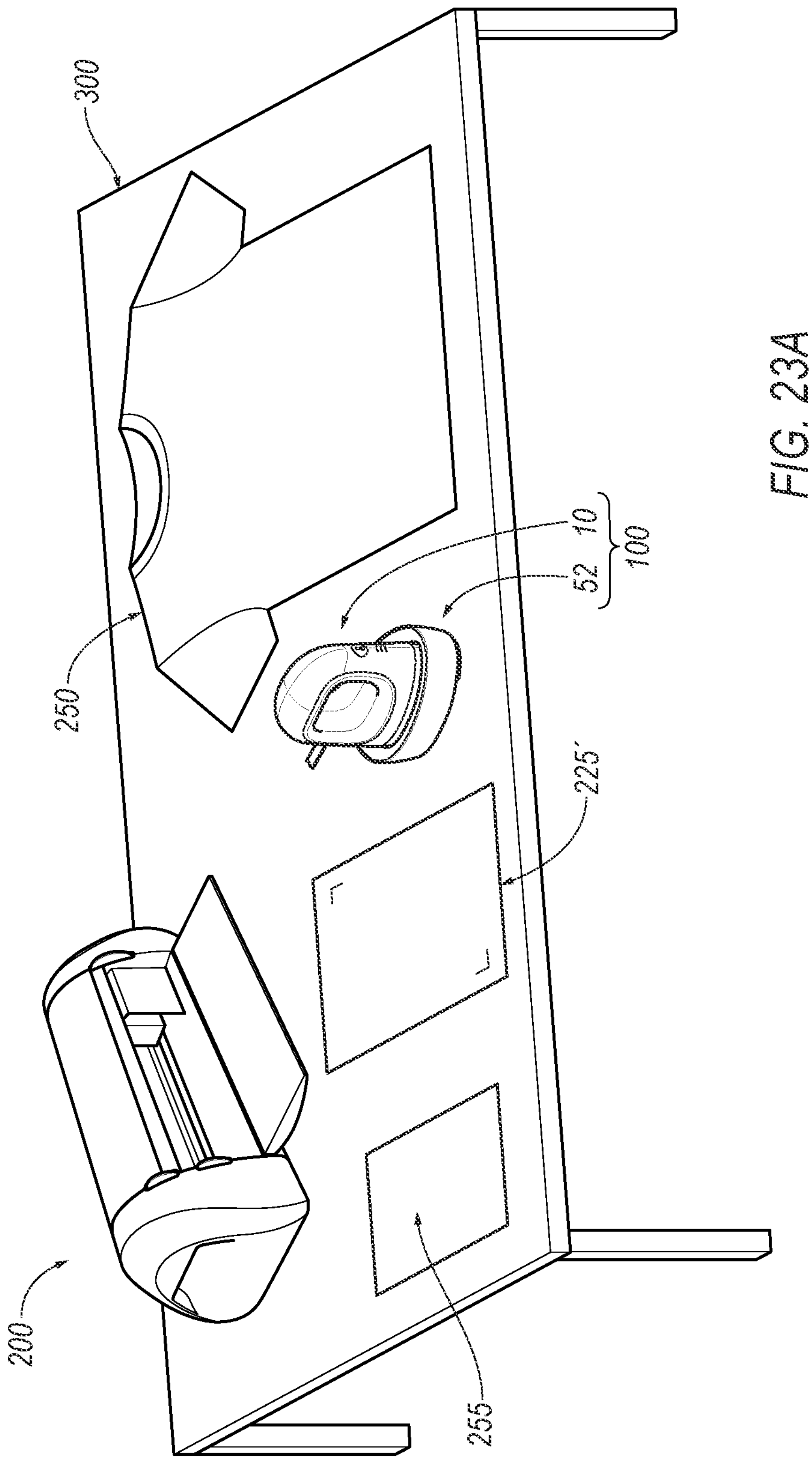
FIGS. 23A-23C is a perspective view of the heat press system of FIGS. 14-22, a processing device, a heat-activated design implement to be processed by the processing device, a cutting mat that supports the heat-activated design implement, and a workpiece arranged upon a table.
Figure 23B:
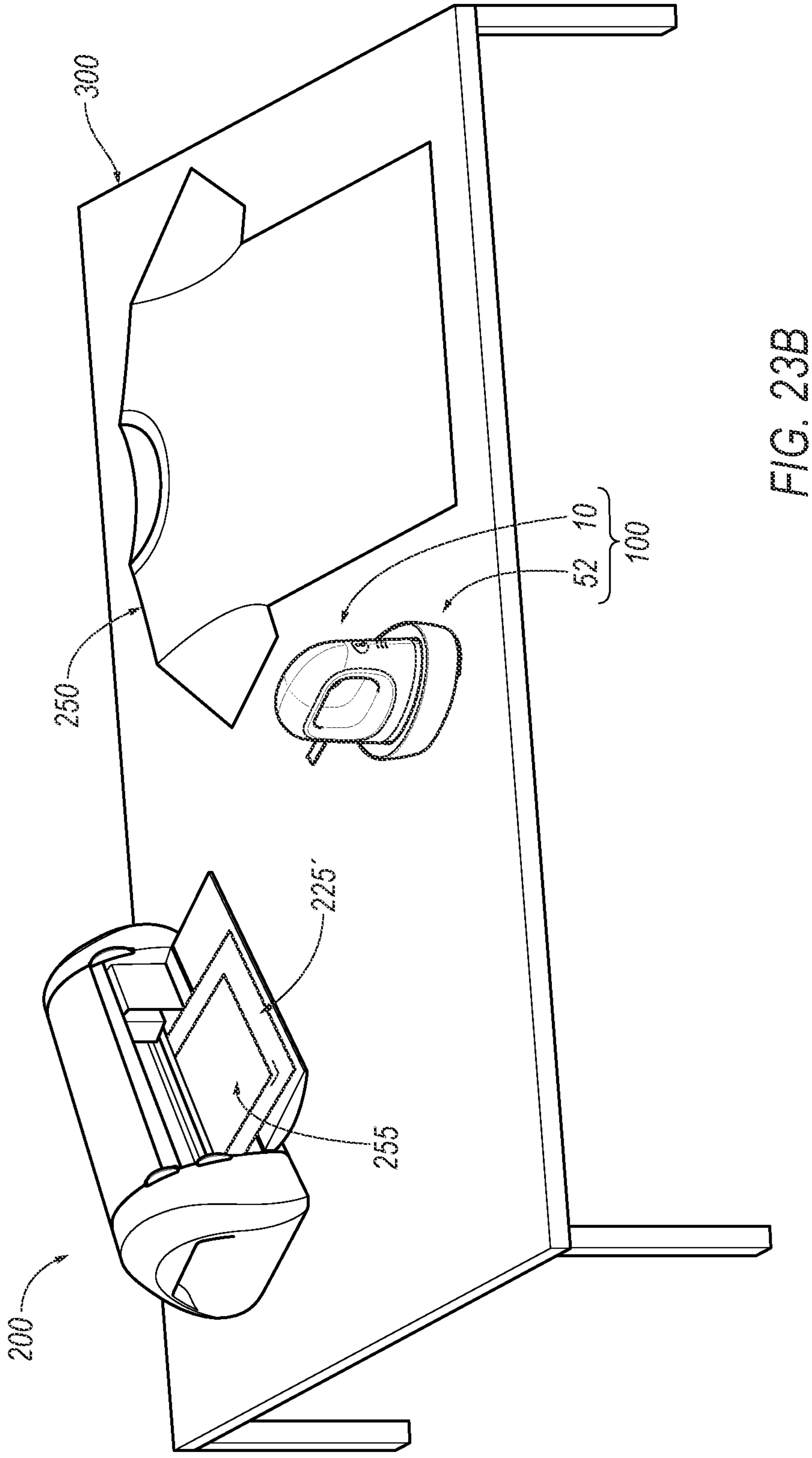
Figure 23C:
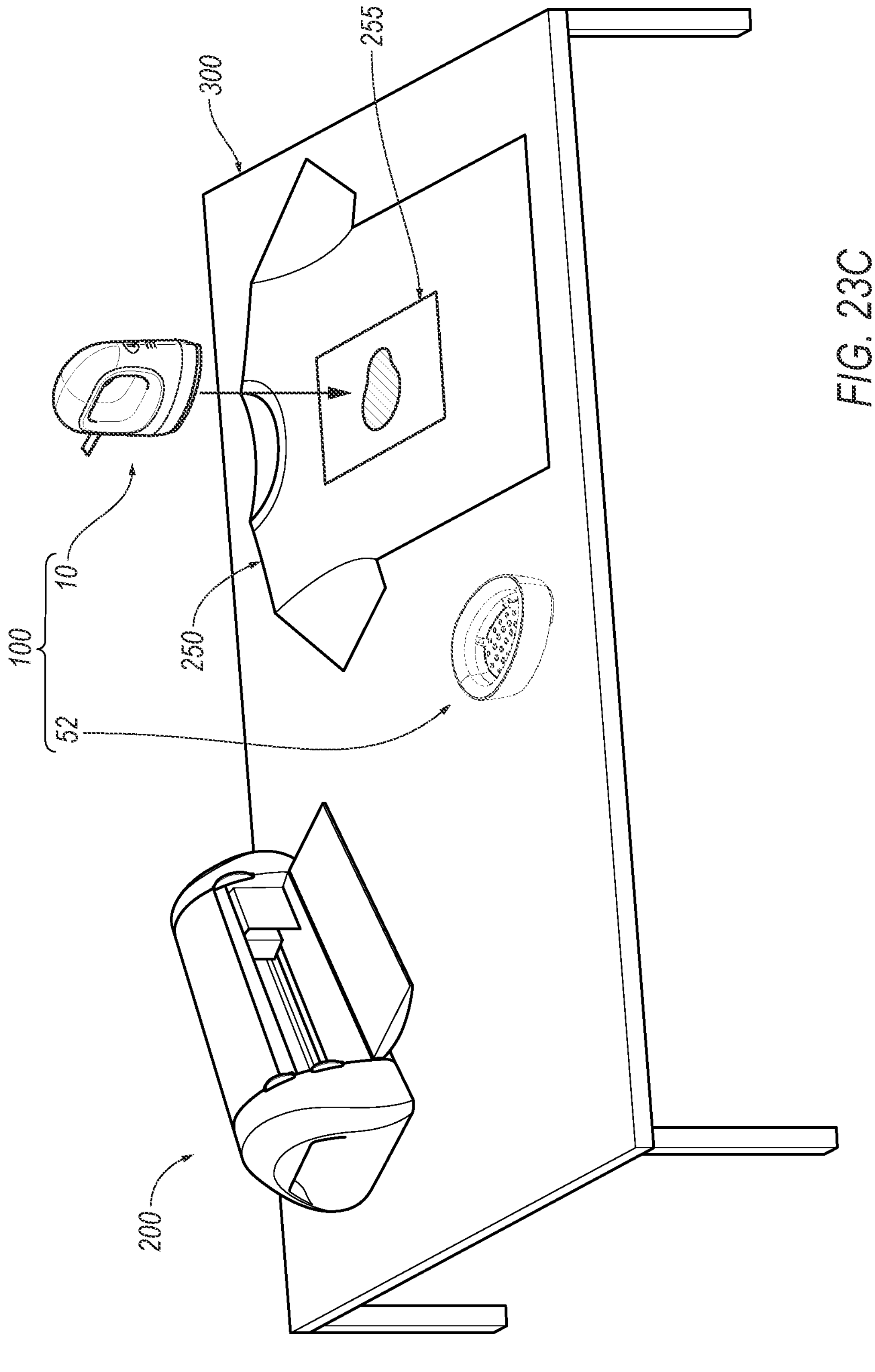
Figure 24A:
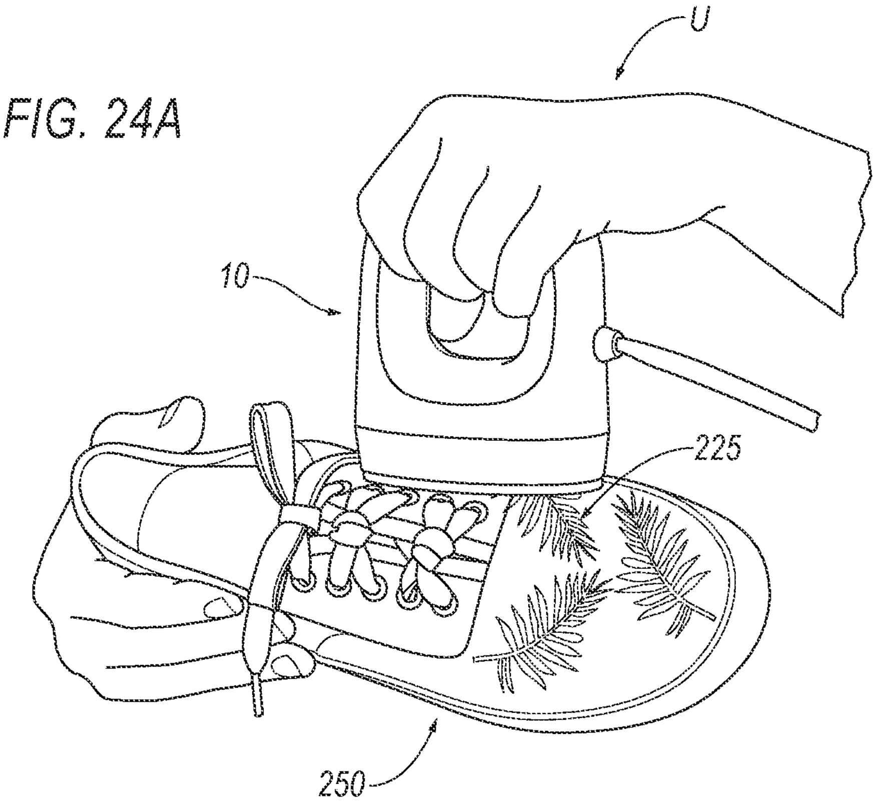
FIGS. 24A-24C are perspective views of a user interfacing the heat press system of FIGS. 1-13 with one or more of a heat-activated design implement and a workpiece arranged upon a table.
Figure 24B:
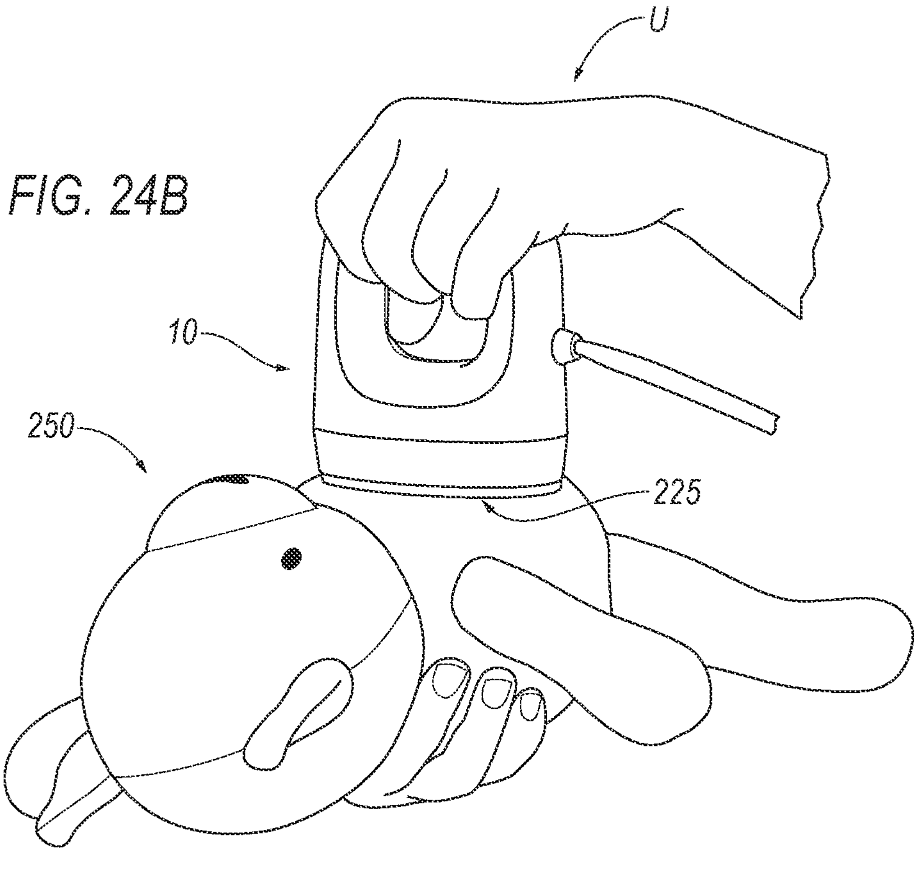
Figure 24C:
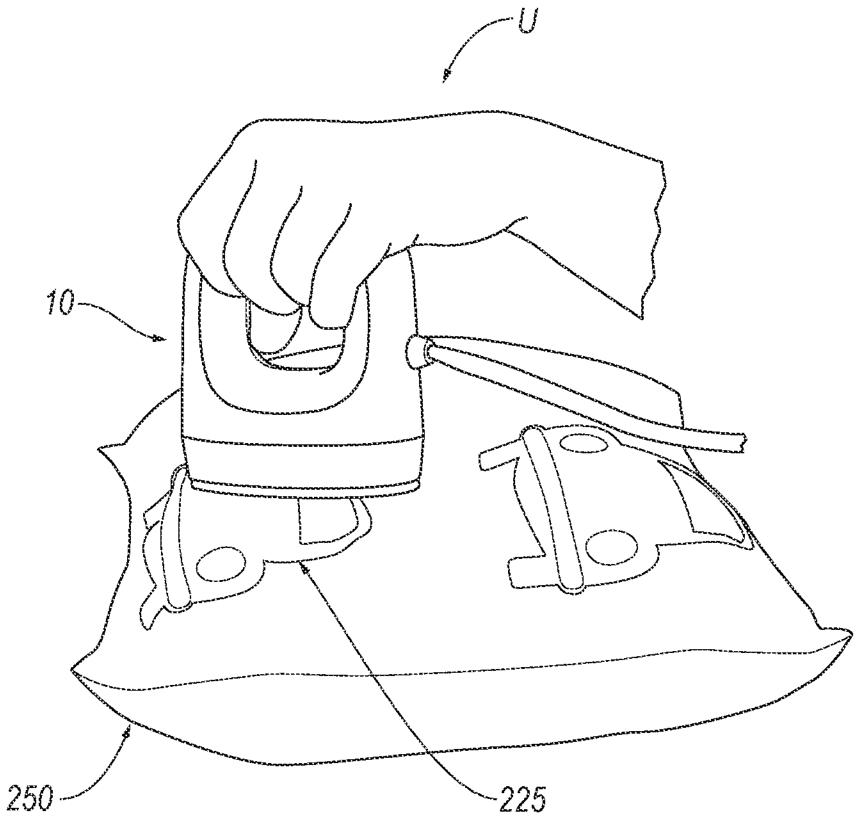

Referring to FIG. 22, another cross-sectional view of the heat press system 100 is shown whereby the inner peripheral body shell portion 60 and the outer peripheral body shell portion 62 are arranged to form a gap 68 there-between. The gap 68 may be entirely closed or partially closed, such that air disposed therein provides an insulating pocket to prevent or limit heat transferring from the inner peripheral body shell portion 60 to outer peripheral body shell portion 62. In some configurations, a vacuum may reside within the gap 68 to enhance the insulative properties of the gap 68.

As noted above, each of the embodiments described in the detailed description above may include any of the features, options, and possibilities set out in the present disclosure figures, including those under the other independent embodiments, and may also include any combination of any of the features, options, and possibilities set out in the present disclosure and figures. Further examples consistent with the present teachings described herein are set out in the following numbered clauses:

Clause 1: A heat press docking station base comprising: a nest portion including a body shell and a perforated floor, the body shell having a lower surface, the perforated floor connected to the body shell; and one or more legs extending from a lower surface of the body shell.

Clause 2: The heat press docking station base of clause 1, wherein the body shell includes: an inner peripheral body shell portion; and an outer peripheral body shell portion joined to the inner peripheral body shell portion.

Clause 3: The heat press docking station base of clause 2, wherein the one or more legs integrally extend from a lower surface of the outer peripheral body shell portion joined to the inner peripheral body shell portion.

Clause 4: The heat press docking station base of clause 2 or clause 3, wherein the inner peripheral body shell portion and the outer peripheral body shell portion joined to the inner peripheral body shell portion cooperate to form one or more peripheral interior spaces or gaps that include an insulative gas.

Clause 5: The heat press docking station base of clause 4, wherein the insulative gas is subjected to a vacuum.

Clause 6: The heat press docking station base of any of clauses 2 to 5, further comprising: one or more heat plate support protrusions extending from the nest portion.

Clause 7: The heat press docking station base of clause 6, wherein the one or more heat plate support protrusions extend from: the inner peripheral body shell portion of the nest portion.

Clause 8: The heat press docking station base of clause 6 or clause 7, wherein the one or more heat plate support protrusions extend from: the perforated floor of the nest portion.

Clause 9: The heat press docking station base of any of clauses 6 to 8, wherein the one or more heat plate support protrusions extend from: the inner peripheral body shell portion of the nest portion; and the perforated floor of the nest portion.

Clause 10: The heat press docking station base of any of clauses 6 to 9, wherein the one or more heat plate support protrusions are not aligned with and are offset from the one or more legs at a distance.

Clause 11: The heat press docking station base of any of clauses 6 to 10, wherein an upper-most surface of the one or more heat plate support protrusions extend away from an upper surface of the perforated floor at a first distance, wherein the one or more legs extend away from a lower surface of the perforated floor at a second distance, and wherein the first distance, the second distance and a thickness of the perforated floor define a length of each perforated passage extending through the thickness of the perforated floor.

Clause 12: The heat press docking station base of any of the preceding clauses, further comprising: a heat resistant material insert disposed within a cavity formed by the one or more legs.

Clause 13: A subassembly of a heat press, the subassembly comprising: a force deflector including an upper handle portion; and an insulation base portion coupled to the force deflector.

Clause 14: The subassembly of clause 13, wherein the force deflector further comprises: a lower bowl-shaped portion extending from a distal end of the upper handle portion, wherein the lower bowl-shaped portion includes downwardly-facing lip.

Clause 15: The subassembly of clause 14, wherein the insulation base portion further comprises: a lower bowl-shaped portion including: a downwardly-facing lip and a peripheral upwardly-facing ledge surface that defines a portion of an upper surface of the insulation base portion, wherein the downwardly-facing lip of the lower bowl-shaped portion of the force deflector is disposed adjacent, and mates with, the peripheral upwardly-facing ledge surface of the insulation base portion.

Clause 16: The subassembly of clause 15, wherein a proximal end of the upper handle portion of the force deflector is configured to receive a user-applied force that is deflected: in a first direction from the proximal end of the upper handle portion of the force deflector; then in a second direction from the distal end of the upper handle portion of the force deflector out of the downwardly-facing lip of the lower bowl-shaped portion of the force deflector; then into the peripheral upwardly-facing ledge surface of the upper surface of the insulation base portion in a third direction; and then out of the downwardly-facing lip of the lower bowl-shaped portion of the insulation base portion in a fourth direction.

Clause 17: The subassembly of any of clauses 14 to 16, further comprising: an insulation layer disposed within the lower bowl-shaped portion of the force deflector.

Clause 18: The subassembly of any of clauses 14 to 17, further comprising: an insulation layer disposed within the lower bowl-shaped portion of the insulation base portion.

Clause 19: The subassembly of any of clauses 14 to 18, further comprising: a first insulation layer disposed within the lower bowl-shaped portion of the insulation base portion; and a second insulation layer disposed within the lower bowl-shaped portion of the force deflector.

Clause 20: The subassembly of any of clauses 14 to 18, wherein: the force deflector at least partially defines a proximal end of the heat press that is configured to receive a user-applied force; and the insulation base portion at least partially defines a distal end of the heat press that is configured to output the user-applied force.

Clause 21: A heat press comprising: a deflector subassembly including a force deflector and an insulation base portion, the force deflector including an upper handle portion, the insulation base portion connected to the force deflector; a heating subassembly including electronics, a heating coil, and a heat plate, the electronics connected to a power source, wherein the electronics includes at least one actuator and a controller, the heating coil connected to the electronics, the a heat plate thermally coupled to the heating coil; and a housing cover that is connected to and at least partially encloses one or more components of both of the deflector subassembly and the heating subassembly.

Clause 22: The heat press of clause 21, wherein the force deflector further comprises: a lower bowl-shaped portion extending from a distal end of the upper handle portion, wherein the lower bowl-shaped portion includes a downwardly-facing lip.

Clause 23: The heat press of clause 22, wherein the insulation base portion further comprises: a lower bowl-shaped portion having: a downwardly-facing lip; and a peripheral upwardly-facing ledge surface that defines a portion of an upper surface of the insulation base portion, wherein the downwardly-facing lip of the lower bowl-shaped portion of the force deflector is disposed adjacent and mates with the peripheral upwardly-facing ledge surface of the insulation base portion.

Clause 24: The heat press of clause 23, wherein a proximal end of the upper handle portion of the force deflector is configured to receive a user-applied force that is deflected: in a first direction from the proximal end of the upper handle portion of the force deflector; then in a second direction from the distal end of the upper handle portion of the force deflector out of the downwardly-facing lip of the lower bowl-shaped portion of the force deflector; then into the peripheral upwardly-facing ledge surface of the upper surface of the insulation base portion in a third direction; and then out of the downwardly-facing lip of the lower bowl-shaped portion of the insulation base portion in a fourth direction into a peripheral edge of an upper surface of the heat plate.

Clause 25: The heat press of any of clauses 22 to 24 further comprising: an insulation layer disposed within the lower bowl-shaped portion of the force deflector.

Clause 26: The heat press of any of clauses 22 to 25 further comprising: an insulation layer disposed within the lower bowl-shaped portion of the insulation base portion.

Clause 27: The heat press of clause 26, wherein a peripheral edge of an upper surface of the heat plate is disposed adjacent the downwardly-facing lip of the lower bowl-shaped portion of the insulation base portion whereby the heat plate encloses a cavity formed for the lower bowl-shaped portion of the insulation base portion for containing the insulation layer within the lower bowl-shaped portion of the insulation base portion.

Clause 28: The heat press of any of clauses 22 to 27 further comprising: a first insulation layer disposed within the lower bowl-shaped portion of the insulation base portion; and a second insulation layer disposed within the lower bowl-shaped portion of the force deflector.

Clause 29: The heat press of clause 28, wherein a peripheral edge of an upper surface of the heat plate is disposed adjacent the downwardly-facing lip of the lower bowl-shaped portion of the insulation base portion whereby the heat plate encloses a cavity formed for the lower bowl-shaped portion of the insulation base portion for containing the first insulation layer within the lower bowl-shaped portion of the insulation base portion.

Clause 30: The heat press of any of clauses 22 to 29, wherein: the force deflector at least partially defines a proximal end of the heat press that is configured to receive a user-applied force; and the insulation base portion at least partially defines a distal end of the heat press that is configured to output the user-applied force.

Clause 31: A heating subassembly of a heat press, the heating subassembly comprising: a heat plate including a body having a side surface and an upper surface, the side surface coupling the upper surface of the body to an implement-contact heating surface, wherein the upper surface defines a heating coil enclosure portion; and a heating coil disposed within the heating coil enclosure portion whereby the heating coil is configured to heat the implement-contact heating surface of the heat plate.

Clause 32: The subassembly of clause 31, wherein the side surface includes a first outer peripheral edge and a second outer peripheral edge, the second outer peripheral edge extending from the first outer peripheral edge at an angle that defines a precision tip.

Clause 33: The subassembly of clause 32, wherein the angle is between about 10° and about 120°.

Clause 34: The subassembly of clause 32 or clause 33, wherein an outer peripheral surface of the heating coil is equally spaced away from the first outer peripheral edge and the second outer peripheral edge at a distance.

Clause 35: The subassembly of any of clauses 32 to 34, wherein the heating coil includes a first end and a second end, wherein a length of the heating coil extending between the first end and the second end is non-linearly arranged in a substantially tear-drop shape, wherein the first end of the heating coil is arranged near the precision tip, wherein the second end of the heating coil is arranged near but spaced away from the first end of the heating coil.

Clause 36: The subassembly of clause 35, wherein a first terminal of the heating coil extends substantially perpendicularly from the first end of the heating coil, wherein a second terminal extends substantially perpendicularly from the second end of the heating coil.

Clause 37: The subassembly of clause 36, wherein the heating coil enclosure portion defines an inlet opening and an outlet opening, wherein the inlet opening is sized for permitting passage of the first terminal of the heating coil there-through, wherein the outlet opening is sized for permitting passage of the second terminal there-through.

Clause 38: A compact packaging subassembly of a heat press, the compact packaging subassembly comprising: a housing cover including a proximal end, a distal end, a handle portion, a leading side portion having a proximal end portion extending from a first end of the handle portion, a trailing side portion having a proximal end portion extending from a second end of the handle portion, and a heating subassembly-receiving base portion having a first end and a second end, wherein the first end of the heating subassembly-receiving base portion is connected to a distal end portion of the leading side portion, wherein the second end of the heating subassembly-receiving base portion is connected to a distal end portion of the trailing side portion, wherein the handle portion, the leading side portion, the trailing side portion, and the heating subassembly-receiving base portion define a passage extending through the housing cover; and electronics disposed within the proximal end of the housing cover and away from the heating subassembly-receiving base portion that at least partially defines the distal end of the housing cover.

Clause 39: The compact packaging subassembly of clause 38, wherein the electronics include: a first printed circuit board arranged perpendicular to a horizontal plane defined by the heating subassembly-receiving base portion; and a second printed circuit board arranged perpendicular to a horizontal plane defined by the heating subassembly-receiving base portion.

Clause 40: The compact packaging subassembly of clause 39, wherein the first printed circuit board is at least partially disposed within the handle portion of the housing cover, wherein the second printed circuit board is at least partially disposed within the leading side portion of the housing cover.

Clause 41: The compact packaging subassembly of clause 39 or clause 40, wherein the first printed circuit board includes at least one of a power converter, an amplifier, or a rectifier.

Clause 42: The compact packaging subassembly of clause 41, wherein first printed circuit board is connected to a power source.

Clause 43: The compact packaging subassembly of any of clauses 39 to 42, wherein second printed circuit board include at least a controller that is communicatively-coupled to one or more user-actuatable actuators arranged on an exterior surface of the housing cover.

Clause 44: The compact packaging subassembly of any of clauses 39 to 43, wherein second printed circuit board include at least a controller that is communicatively-coupled to one or more indicators arranged on an exterior surface of the housing cover.

Clause 45: The compact packaging subassembly of any of clauses 38 to 44, wherein the electronics includes: at least one motion detection sensor communicatively-coupled to a controller that powers-off the electronics when the housing cover is not moved for a period of time by a user.

Clause 46: The compact packaging subassembly of clause 45, wherein the at least one motion detection sensor is an accelerometer.

Clause 47: The compact packaging subassembly of any of clauses 38 to 46, wherein the electronics includes: one or more tilt sensors communicatively-coupled to a controller that powers-off the electronics when the housing cover is not tilted to a horizontal orientation by a user.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A heat press docking station base comprising:

a nest portion including a body shell and a perforated floor, the body shell having a lower surface, the perforated floor connected to the body shell; and one or more legs extending from a lower surface of the body shell;

wherein the body shell comprises:

an inner peripheral body shell portion; and an outer peripheral body shell portion joined to the inner peripheral body shell portion.

2. The heat press docking station base of claim 1, wherein the one or more legs integrally extend from a lower surface of the outer peripheral body shell portion joined to the inner peripheral body shell portion.

3. The heat press docking station base of claim 1, wherein the inner peripheral body shell portion and the outer peripheral body shell portion joined to the inner peripheral body shell portion cooperate to form one or more peripheral interior spaces or gaps that include an insulative gas.

4. The heat press docking station base of claim 3, wherein the insulative gas is subjected to a vacuum.

5. The heat press docking station base of claim 1 further comprising one or more heat plate support protrusions extending from the nest portion.

6. The heat press docking station base of claim 5, wherein the one or more heat plate support protrusions extend from the inner peripheral body shell portion of the nest portion.

7. The heat press docking station base of claim 5, wherein the one or more heat plate support protrusions extend from the perforated floor of the nest portion.

8. The heat press docking station base of claim 5, wherein the one or more heat plate support protrusions extend from:

the inner peripheral body shell portion of the nest portion; and the perforated floor of the nest portion.

9. The heat press docking station base of claim 5, wherein the one or more heat plate support protrusions are not aligned with and are offset from the one or more legs.

10. The heat press docking station base of claim 5, wherein an upper-most surface of the one or more heat plate support protrusions extend away from an upper surface of the perforated floor at a first distance, wherein the one or more legs extend away from a lower surface of the perforated floor at a second distance, and wherein the first distance, the second distance and a thickness of the perforated floor define a length of each perforated passage extending through the thickness of the perforated floor.

11. The heat press docking station base of claim 1 further comprising a heat resistant material insert disposed within a cavity formed by the one or more legs.

12. A heat press comprising:

a deflector subassembly including a force deflector and an insulation base portion, the force deflector including an upper handle portion, the insulation base portion connected to the force deflector;

a heating subassembly including a heating coil and a heat plate the heat plate thermally coupled to the heating coil;

a housing cover that is connected to and at least partially encloses one or more components of one or both of the deflector subassembly and the heating subassembly, wherein the housing cover comprises a leading side portion and a trailing side portion; and electronics disposed within the housing cover, wherein the electronics comprise:

a first printed circuit board coupled to and at least partially disposed within the housing cover adjacent to the upper handle portion of the force deflector; and a second printed circuit board at least partially disposed within the leading side portion of the housing cover.

13. The heat press of claim 12, wherein the force deflector further comprises a lower bowl-shaped portion extending from a distal end of the upper handle portion, wherein the lower bowl-shaped portion includes a downwardly-facing lip.

14. The heat press of claim 13, wherein the insulation base portion further comprises:

a lower bowl-shaped portion having:

a downwardly-facing lip; and a peripheral upwardly-facing ledge surface that defines a portion of an upper surface of the insulation base portion, wherein the downwardly-facing lip of the lower bowl-shaped portion of the force deflector is disposed adjacent and mates with the peripheral upwardly-facing ledge surface of the insulation base portion.

15. The heat press of claim 12, wherein a peripheral edge of the heat plate defines a tear-drop shape.

16. The heat press of claim 15, wherein:

the peripheral edge of the heat plate comprises a leading edge portion and a trailing edge portion opposite the leading edge portion;

the leading edge portion is narrower than the trailing edge portion; and the trailing edge portion is curved.

17. The heat press of claim 16, wherein the peripheral edge of the heat plate comprises opposing lateral sides that extend between the leading edge portion and the trailing edge portion, wherein the trailing edge portion and the opposing lateral sides form a bulbous shape.

18. The heat press of claim 12, wherein the heat plate comprises an implement-contact heating surface configured to be pressed against a workpiece during use, wherein the implement-contact heating surface is solid and continuous and is thus free of holes and apertures.

19. A heat press docking station base comprising:

a nest portion including a body shell and a perforated floor, the body shell having a lower surface, the perforated floor connected to the body shell;

one or more legs extending from a lower surface of the body shell; and a heat resistant material insert disposed within a cavity formed by the one or more legs.

20. The heat press docking station base of claim 19, wherein the body shell includes:

an inner peripheral body shell portion; and an outer peripheral body shell portion joined to the inner peripheral body shell portion.

* * * * *